(12) United States Patent
McGibney et al.

(10) Patent No.: US 9,262,016 B2
(45) Date of Patent: Feb. 16, 2016

(54) GESTURE RECOGNITION METHOD AND INTERACTIVE INPUT SYSTEM EMPLOYING SAME

(75) Inventors: Grant McGibney, Calgary (CA); Qizhi Joanna Xu, Calgary (CA); Erik Benner, Cochrane (CA); Edward Tse, Calgary (CA)

(73) Assignee: SMART Technologies ULC, Calgary (CA)

( * ) Notice: Subject to any disclaimer, the term of this patent is extended or adjusted under 35 U.S.C. 154(b) by 467 days.

(21) Appl. No.: 13/143,266

(22) PCT Filed: Jan. 5, 2010

(86) PCT No.: PCT/CA2010/000002
§ 371 (c)(1),
(2), (4) Date: Oct. 3, 2011

(87) PCT Pub. No.: WO2010/091496
PCT Pub. Date: Aug. 19, 2010

(65) Prior Publication Data
US 2012/0013529 A1    Jan. 19, 2012

Related U.S. Application Data

(60) Provisional application No. 61/142,545, filed on Jan. 5, 2009.

(51) Int. Cl.
G06F 3/042      (2006.01)
G06F 3/0488    (2013.01)

(52) U.S. Cl.
CPC ............ *G06F 3/0428* (2013.01); *G06F 3/0425* (2013.01); *G06F 3/04883* (2013.01); *G06F 2203/04109* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 6,972,401 B2 | 12/2005 | Akitt et al. | |
| 7,129,927 B2 | 10/2006 | Mattsson et al. | |
| 7,176,904 B2 | 2/2007 | Satoh et al. | |
| 7,411,545 B2 | 8/2008 | Dutton | |
| 7,411,575 B2 | 8/2008 | Hill et al. | |
| 2003/0076293 A1 | 4/2003 | Mattsson | |
| 2003/0085871 A1 | 5/2003 | Ogawa | |
| 2006/0044282 A1 | 3/2006 | Pinhanez et al. | |
| 2006/0244734 A1 | 11/2006 | Hill | |
| 2008/0029691 A1* | 2/2008 | Han | 250/224 |
| 2009/0237361 A1* | 9/2009 | Mosby et al. | 345/173 |
| 2009/0273569 A1* | 11/2009 | Popp et al. | 345/173 |
| 2010/0201631 A1* | 8/2010 | Taylor et al. | 345/173 |
| 2013/0234957 A1* | 9/2013 | Shirato | 345/173 |

OTHER PUBLICATIONS

Oct. 26, 2012 First Office Action for Chinese Patent Application No. 20108000940.7.

(Continued)

*Primary Examiner* — Seokyun Moon
(74) *Attorney, Agent, or Firm* — Katten Muchin Rosenman LLP

(57) ABSTRACT

A gesture recognition method comprises capturing images, processing the images to identify at least two clusters of touch points associated with at least two pointers, recognizing a gesture based on motion of the clusters, and updating a display in accordance with the recognized gesture.

14 Claims, 31 Drawing Sheets

(56) References Cited

OTHER PUBLICATIONS

Communication: Transmittal of International Search Report; International Search Report; and Written Opinion for International Patent Application No. PCT/CA2010/000002 mailed Jun. 3, 2010.

Mar. 22, 2013 Extended European Search Report for European Patent Application No. 10 74 0861.

Apr. 22, 2013 letter from Oliveres & CIA summarizing in English an office Action for Mexican National Phase Patent Application No. MX/a/20111007245.

\* cited by examiner

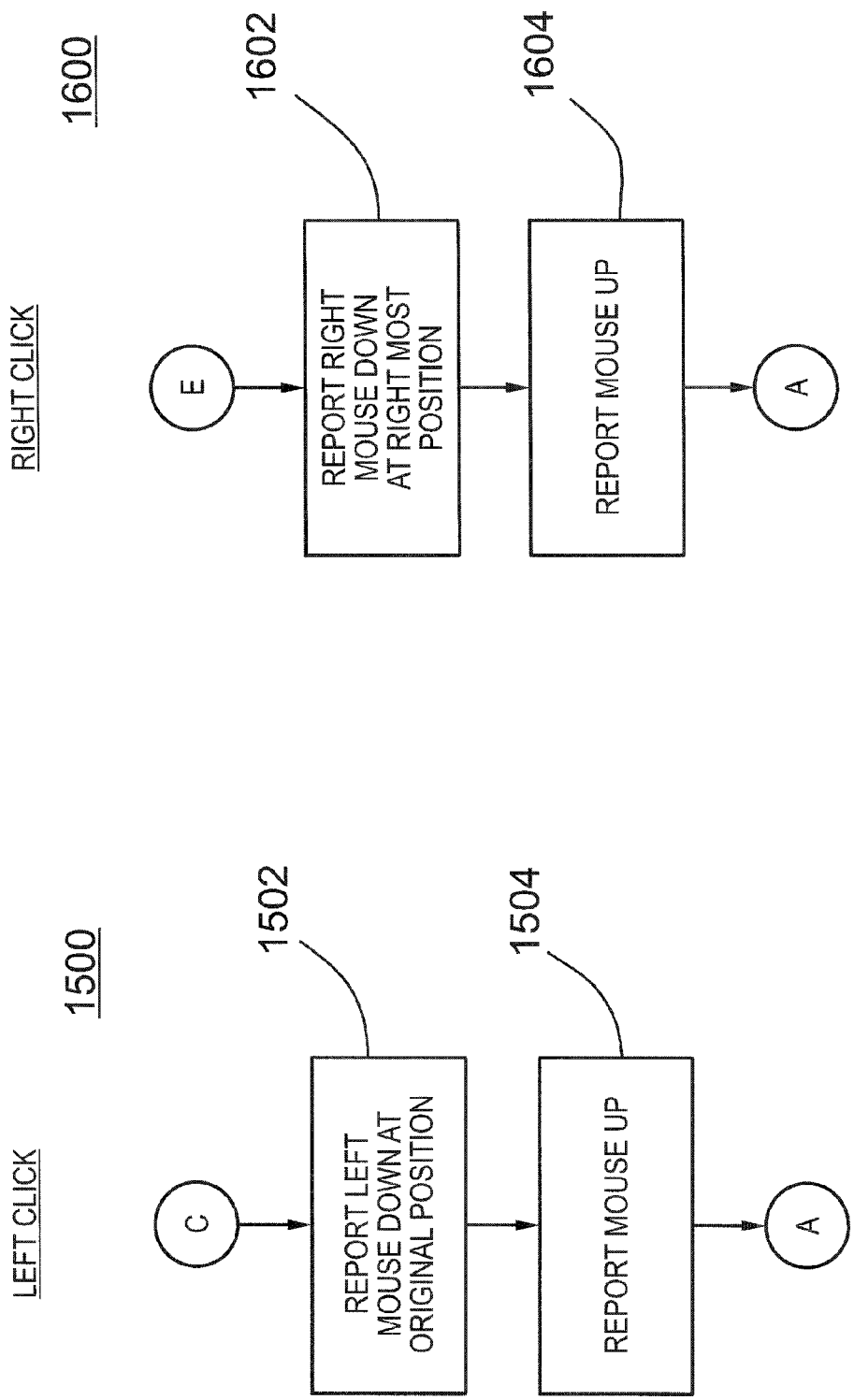

GESTURE RECOGNITION METHOD AND INTERACTIVE INPUT SYSTEM EMPLOYING SAME

This application is a national stage of PCT/CA2010/000002, filed on Jan. 5, 2010, which claims priority to U.S. Provisional Patent Application No. 61/142,545, filed on Jan. 5, 2009. Each of these documents is incorporated herein by reference in its entirety.

FIELD OF THE INVENTION

The present invention relates generally to gesture recognition and in particular, to a gesture recognition method and to an interactive input system employing the same.

BACKGROUND OF THE INVENTION

Interactive input systems that allow users to inject input (e.g. digital ink, mouse events etc.) into an application program using an active pointer (e.g. a pointer that emits light, sound or other signal), a passive pointer (e.g. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); touch-enabled laptop PCs; personal digital assistants (PDAs); and other similar devices.

Gesture recognition methods employed by interactive input systems have been considered. For example, U.S. Pat. No. 7,411,575 to Hill et al. and assigned to SMART Technologies ULC, the contents of which are incorporated by reference, discloses a gesture recognition method employed by a machine vision interactive input system. During the method, multiple pointers in close proximity to a touch surface are detected to determine if the multiple pointers are being used to perform a known gesture. When the multiple pointers are being used to perform a known gesture, a command associated with the gesture is executed. Specifically, pointer data is examined to detect the existence of multiple pointers in captured images and then the nature of the multiple pointers is examined to determine if a known gesture has been performed, such as for example a right-click gesture, a scroll gesture, a rotate gesture etc. When a known gesture has been performed, a command event is generated that is associated with the determined gesture and the command event is conveyed to the active application program being executed by a computer.

U.S. Pat. No. 7,176,904 to Satoh discloses a touch panel with a display screen. An optical reflection film is provided on three sides of the display screen and reflects light towards two optical units aligned to look across the touch panel. A coordinate control section detects when a pointer has touched on the panel and generates a signal according to the detected point. The coordinate control section generates a coordinate signal that shows coordinates of a touched point, when one point touch on the panel has been detected. When simultaneous touches of two or more points on the panel have been detected, the coordinate control section generates a control signal that shows a control set in advance corresponding to the number of touched points.

U.S. Patent Application Publication Nos. 2008/0180404; 2008/0180405; and 2008/018406 to Han disclose methods and systems for interfacing with multi-point input devices that employ techniques for controlling displayed images including 2D and 3D image translation, scale/zoom, rotation control and globe axis tilt control. Various control techniques employ three or more simultaneous inputs, changes in characteristics of the inputs and pressure sensing.

In interactive input systems that employ rear projection devices to present images on the input surfaces of the interactive input systems (such as rear projection displays, liquid crystal display (LCD) devices, plasma televisions, etc.), multiple pointers from more than one user that are brought into contact with the input surfaces are difficult to locate and track, especially in interactive input systems employing only two imaging devices. For example, in interactive input systems employing two imaging devices, when multiple pointers are being tracked, the triangulation solutions for the pointers include actual pointer locations and imaginary pointer locations resulting in pointer ambiguity issues if the pointers do not carry markings that enable the pointers to be readily differentiated. The ambiguity issues become very complex when recognizing gestures made using multiple pointers.

Therefore, it is an object of the present invention to provide a novel gesture recognition method and a novel interactive input system employing the method.

SUMMARY OF THE INVENTION

Accordingly, in one aspect there is provided a gesture recognition method comprising capturing images looking generally across an input region, processing the images to identify at least two clusters of touch points associated with at least two pointers within the input region, recognizing a gesture based on motion of the clusters of touch points, and updating a display in accordance with the recognized gesture.

According to another aspect there is provided an interactive input system comprising an input surface, at least one imaging sensor having a field of view looking generally across the input surface, and processing structure communicating with said at least one imaging sensor, said processing structure being configured to analyze image data acquired by said at least one imaging sensor to determine the location of a cluster of touch points associated with at least two pointers in contact with the input surface, to recognize successive clusters of touch points representing a gesture based on the relative positions of the clusters of touch points and to execute a command associated with said gesture.

According to another aspect there is provided a gesture recognition method comprising capturing images looking at an input surface, processing the images to identify at least two clusters of touch points associated with at least two pointers, recognizing a gesture based on motion of the clusters of touch points, and updating a display in accordance with the gesture.

According to yet another aspect there is provided an interactive input system comprising an input surface, at least one imaging sensor having a field of view looking at the input surface, and processing structure communicating with said at least one imaging sensor, said processing structure being configured to analyze image data acquired by said at least one imaging sensor to determine the location of a cluster of touch points associated with at least two pointers in contact with the input surface, to recognize successive clusters of touch points representing a gesture based on the relative positions of the clusters of touch points and to execute a command associated with said gesture.

BRIEF DESCRIPTION OF THE DRAWINGS

Embodiments will now be described more fully with reference to the accompanying drawings in which:

FIG. 15 is a flowchart of a left-click gesture routine executed by the master controller of FIG. 3;

FIG. 16 is a flowchart of a right-click gesture routine executed by the master controller of FIG. 3;

DETAILED DESCRIPTION OF THE EMBODIMENTS

Figure 1:
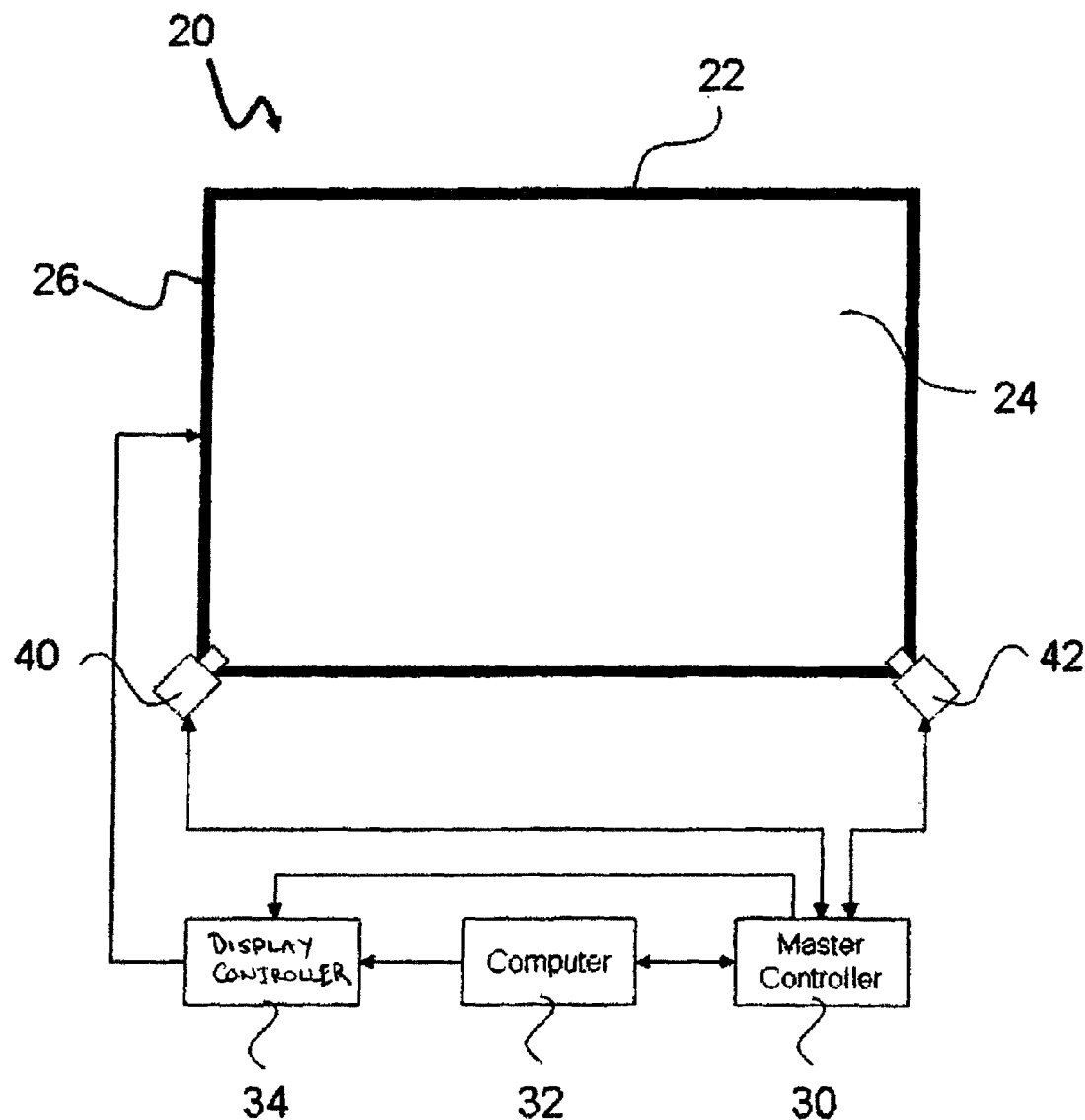
FIG. 1 is a block diagram of an interactive input system employing two imaging devices.

Turning now to FIG. 1, an interactive input system that allows a user to inject input such as digital ink, mouse events etc. into an application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube (CRT) monitor etc. and surrounds the display surface 24 of the display unit. The assembly 22 comprises an illuminated bezel 26 surrounding the display surface such as that described in U.S. Pat. No. 6,972,401 to Akitt et al. issued on Dec. 6, 2005 and assigned to SMART Technologies ULC, the contents of which are incorporated by reference. The bezel 26 provides infrared (IR) backlighting over the display surface 24. The assembly 22 employs machine vision to detect pointers brought into a region of interest in proximity with the display surface 24.

Assembly 22 is coupled to a master controller 30. Master controller 30 is coupled to a general purpose computing device 32 and to a display controller 34. The general purpose computing device 32 executes one or more application programs and uses pointer location and gesture identification information communicated from the master controller 30 to generate and update image data that is provided to the display controller 34 for output to the display unit so that the image presented on the display surface 24 reflects pointer activity. In this manner, pointer activity proximate to the display surface 24 can be recorded as writing or drawing or used to control execution of one or more application programs running on the general purpose computing device 32.

Figure 2:
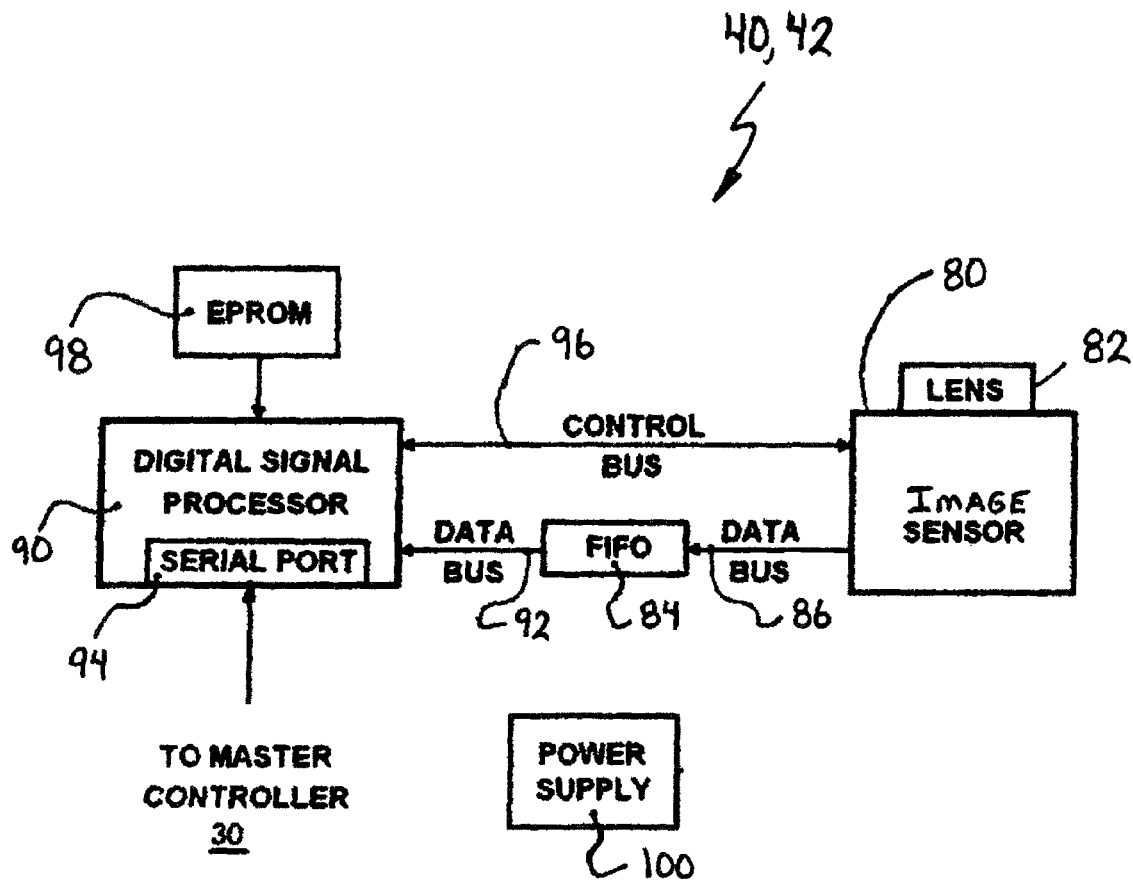
FIG. 2 is a block diagram of one of the imaging devices forming part of the interactive input system of FIG. 1.

Imaging devices 40, 42 are positioned adjacent two corners of the display surface 24 and look generally across the display surface from different vantages. Referring to FIG. 2, one of the imaging devices 40 and 42 is better illustrated. As can be seen, each imaging device comprises an image sensor 80 such as that manufactured by Micron Technology, Inc. of Boise, Id. under model no. MT9V022 fitted with an 880 nm lens 82 of the type manufactured by Boowon Optical Co. Ltd. under model no. BW25B. The lens 82 provides the image sensor 80 with a field of view that is sufficiently wide at least to encompass the display surface 24. The image sensor 80 communicates with and outputs image frame data to a first-in first-out (FIFO) buffer 84 via a data bus 86. A digital signal processor (DSP) 90 receives the image frame data from the FIFO buffer 84 via a second data bus 92 and provides pointer data to the master controller 30 via a serial input/output port 94 when one or more pointers exist in image frames captured by the image sensor 80. The image sensor 80 and DSP 90 also communicate over a bi-directional control bus 96. An electronically programmable read only memory (EPROM) 98, which stores image sensor calibration parameters, is connected to the DSP 90. The imaging device components receive power from a power supply 100.

Figure 3:
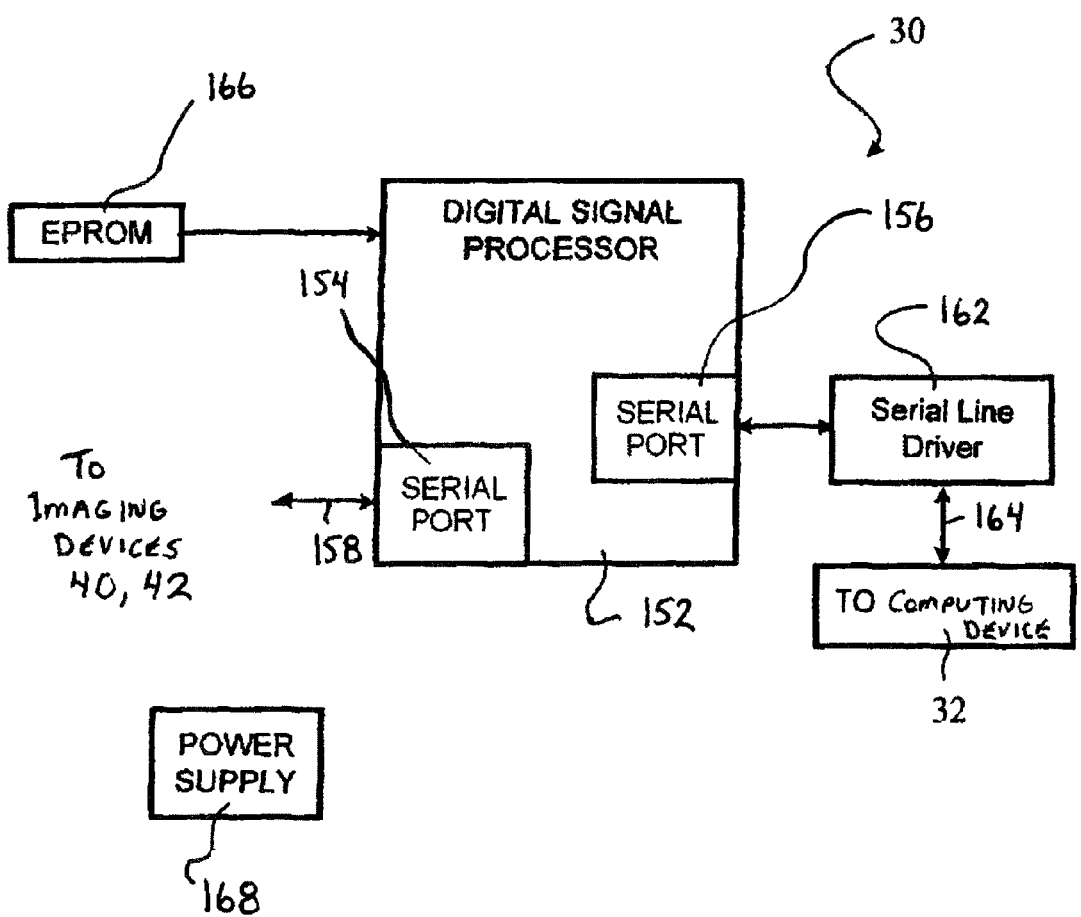
FIG. 3 is a block diagram of a master controller forming part of the interactive input system of FIG. 1.

FIG. 3 better illustrates the master controller 30. Master controller 30 comprises a DSP 152 having a first serial input/output port 154 and a second serial input/output port 156. The master controller 30 communicates with the imaging devices 40 and 42 via first serial input/output port 154 over communication lines 158. Pointer data received by the DSP 152 from the imaging devices 40 and 42 is processed by the DSP 152 to generate pointer location data and to recognize input gestures as will be described. DSP 152 communicates with the general purpose computing device 32 via the second serial input/output port 156 and a serial line driver 162 over communication lines 164. Master controller 30 further comprises an EPROM 166 storing interactive input system parameters that are accessed by DSP 152. The master controller components receive power from a power supply 168.

The general purpose computing device 32 in this embodiment is a computer comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computing device components to the processing unit. The computing device 32 may also comprise a network connection to access shared or remote drives, one or more networked computers, or other networked devices. The processing unit runs a host software application/operating system which, during execution, provides a graphical user interface that is presented on the display surface 24 such that freeform or handwritten ink objects and other objects can be input and manipulated via pointer interaction with the display surface 24.

During operation, the DSP 90 of each imaging device 40, 42, generates clock signals so that the image sensor 80 of each imaging device captures image frames at the desired frame rate. The dock signals provide to the image sensors 80 are synchronized such that the image sensors of the imaging devices 40 and 42 capture image frames substantially simultaneously. When no pointer is in proximity of the display surface 24, image frames captured by the image sensors 80 comprise a substantially uninterrupted bright band as a result of the infrared backlighting provided by the bezel 26. However, when one or more pointers are brought into proximity of the display surface 24, each pointer occludes the IR backlighting provided by the bezel 26 and appears in captured image frames as a dark region interrupting the white bands.

Each image frame output by the image sensor 80 of each imaging device 40, 42 is conveyed to its associated DSP 90. When each DSP 90 receives an image frame, the DSP 90 processes the image frame to detect the existence of one or more pointers. If one or more pointers exist in the image frame, the DSP 90 creates an observation for each pointer in the image frame. Each observation is defined by the area formed between two straight lines, one line of which extends from the focal point of the imaging device and crosses the right edge of the pointer and the other line of which extends from the focal point of the imaging device and crosses the left edge of the pointer. The DSP 90 then conveys the observation (s) to the master controller 30 via serial line driver 162.

The master controller 30 in response to received observations from the imaging devices 40, 42, examines the observations to determine observations from each imaging device that overlap. When each imaging device sees the same pointer resulting in observations generated by the imaging devices 40, 42 that overlap, the center of the resultant bounding box, that is delineated by the intersecting lines of the overlapping observations, and hence the position of the pointer in (x,y) coordinates relative to the display surface 24 is calculated using well known triangulation as described in above-incorporated U.S. Pat. No. 6,803,906 to Morrison at al. The master controller 30 also examines the observations to determine if pointers interacting with the display surface 24 are being used to input gestures.

The master controller 30 in turn outputs calculated pointer positions and gesture information, if a gesture is recognized, to the general purpose computing device 32. The general purpose computing device 32 in turn processes the received pointer positions and gesture information and updates image output provided to the display controller 34, if required, so that the image presented on the display unit can be updated to reflect the pointer activity. In this manner, pointer interaction with the display surface 24 can be recorded as writing or drawing or used to control execution of one or more application programs running on the general purpose computing device 32.

When a single pointer exists in image frames captured by the imaging devices 40, 42, the location of the pointer in (x, y) coordinates relative to the display surface 24 can be readily computed using triangulation. When multiple pointers exist in image frames captured by the imaging devices 40, 42, computing the positions of the pointers in (x, y) coordinates relative to the display surface 24 is more challenging as a result of pointer ambiguity and pointer occlusion issues. Pointer ambiguity arises when multiple pointers are within the fields of view of the imaging devices 40, 42 and the pointers do not have distinctive markings that allow the pointers to be readily differentiated. In such cases, during triangulation, a number of possible solutions for the pointer locations may result.

Figure 4:
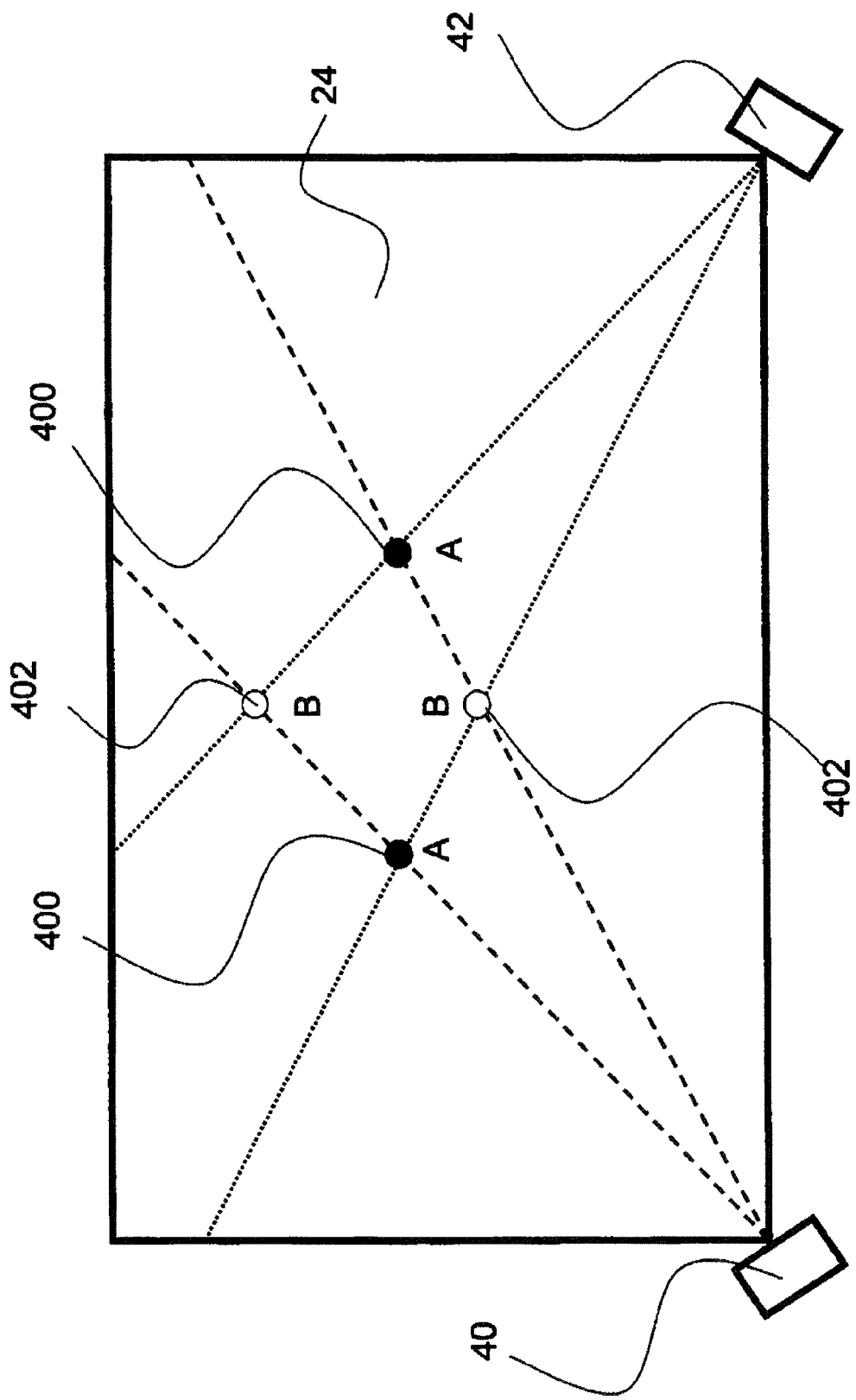
FIG. 4 is an exemplary view showing the sight lines of the imaging devices of the interactive input system of FIG. 1 when two pointers are in the fields of view of the imaging devices as well as real and imaginary pointer location triangulation solutions.

For example, FIG. 4 shows the sight lines of the imaging devices 40, 42 in the case where two pointers are in contact with the display surface 24. As indicated, during triangulation there are two pointer location solutions. Solution (A) represents the actual real pointer locations 400, and solution (B) represents the phantom or imaginary pointer locations 402.

Figure 5:
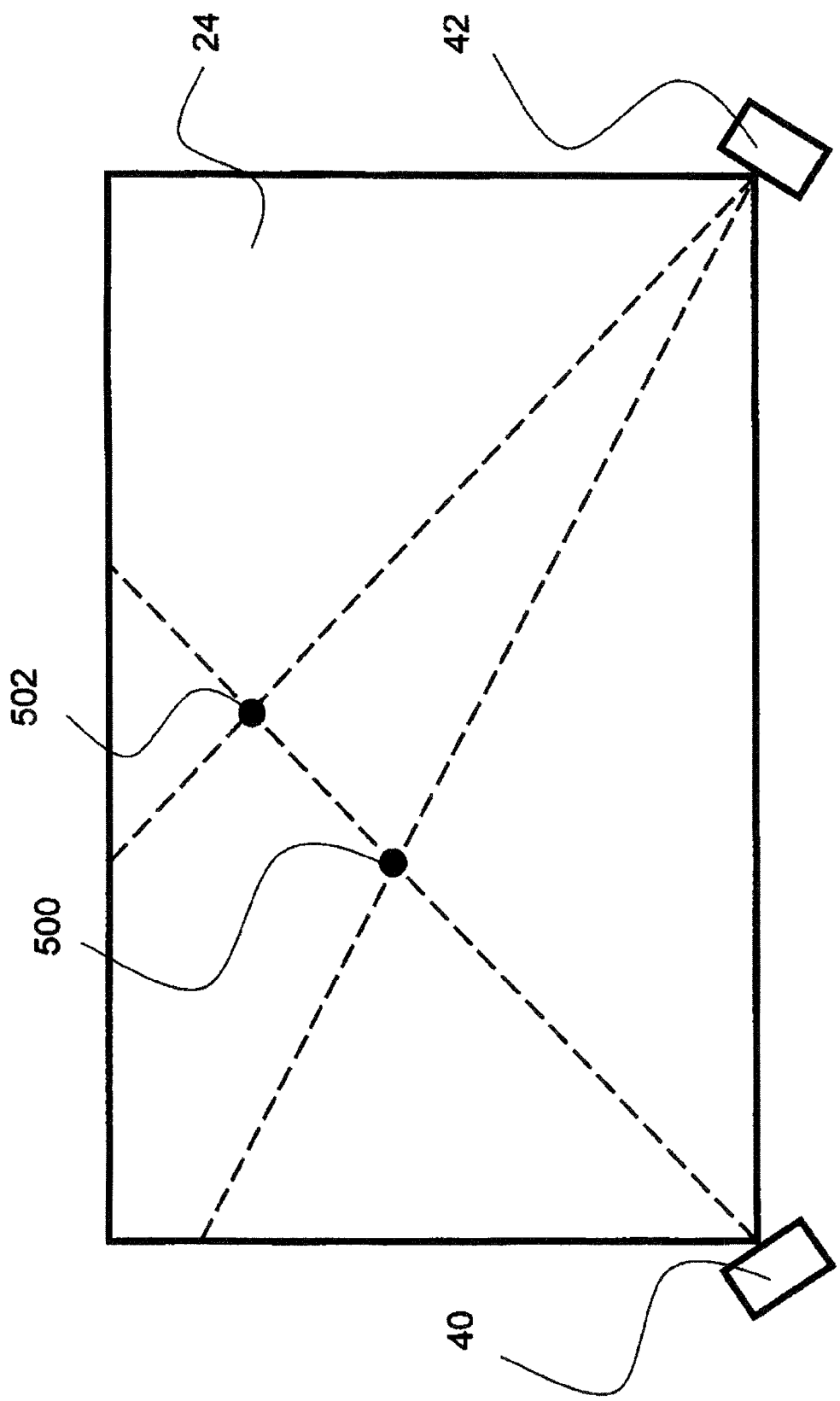
FIG. 5 is another exemplary view showing the sight lines of the imaging devices of the interactive input system of FIG. 1 when two pointers are in the fields of view of the imaging devices.

Occlusion occurs when one pointer occludes another pointer in the field of view of an imaging device. In these instances, the image frame captured by that imaging device includes only one pointer. As a result, the correct locations of the pointers relative to the display surface 24 cannot be disambiguated from phantom pointer locations. For example, FIG. 5 shows the sight lines of, the imaging devices 40, 42 in the case where two pointers are in contact with the display surface 24. As indicated, imaging device 42 sees both pointers 500 and 502. Imaging device 40 however only sees pointer 500 because pointer 500 blocks or occludes pointer 502 from the view of imaging device 40.

When multiple pointers are moved relative to the display surface 24 in order to input a gesture, depending on the type of gesture and the nature of the touch input used, the need to resolve pointer ambiguity may or may not be necessary as will now be exemplified.

Figure 6A:
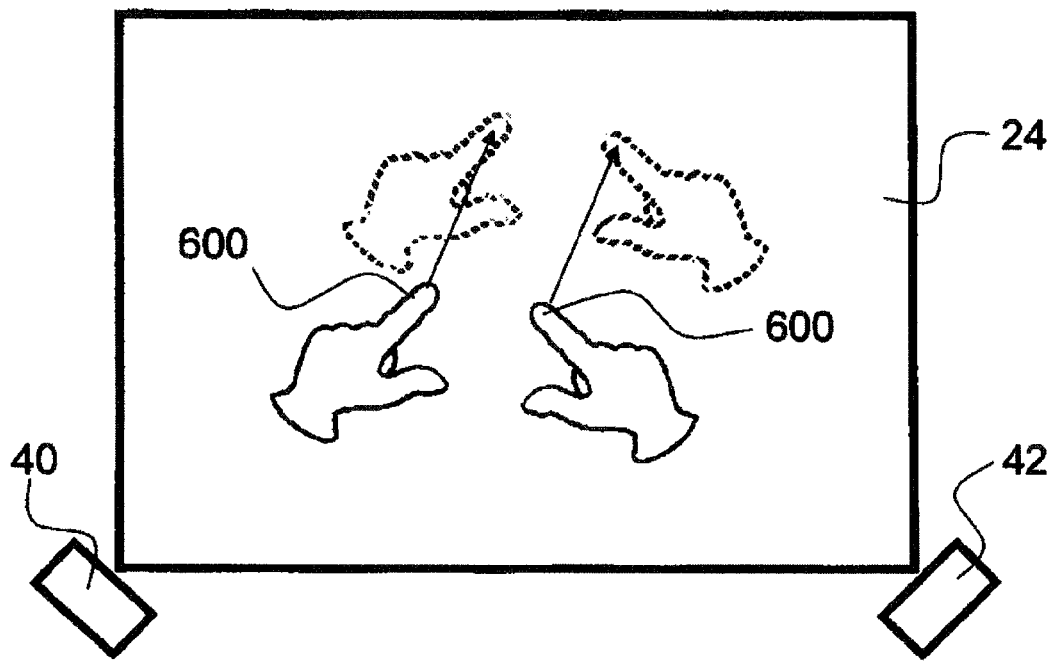
FIG. 6A is an exemplary view of a gesture made using two pointers interacting with the display surface of the interactive input system of FIG. 1.

FIGS. 6A to 9B show various gestures made using two pointers interacting with the display surface 24 together with the real and imaginary pointer location triangulation solutions during input of the gestures. In particular, FIG. 6A shows a pan gesture where two pointers 600 (in this case, one finger from each hand of a user) are brought into contact with an object (not shown) presented on the display surface 24 and then moved in the same direction. FIG. 6B shows the real pair of touch points 602 and the imaginary pair of touch points 604 determined during triangulation. Since all four touch points 602 and 604 move in the same direction, it is not necessary to determine which pair of touch points is real and which pair of touch points is imaginary in order to recognize the pan gesture.

Figure 7A:
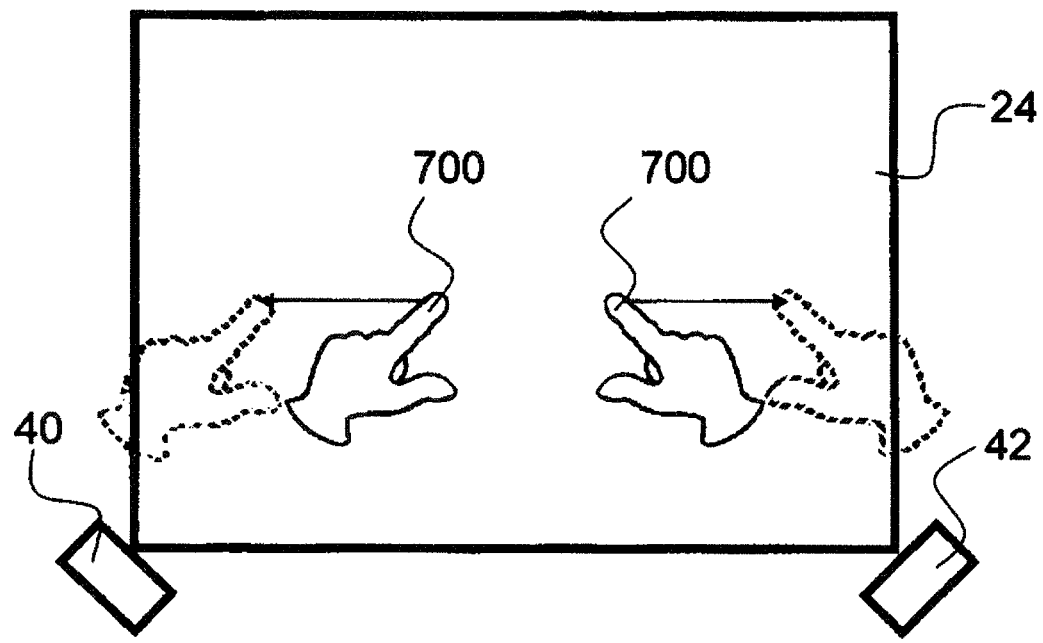
FIG. 7A is an exemplary view of another gesture made using two pointers interacting with the display surface of the interactive input system of FIG. 1.
Figure 7B:
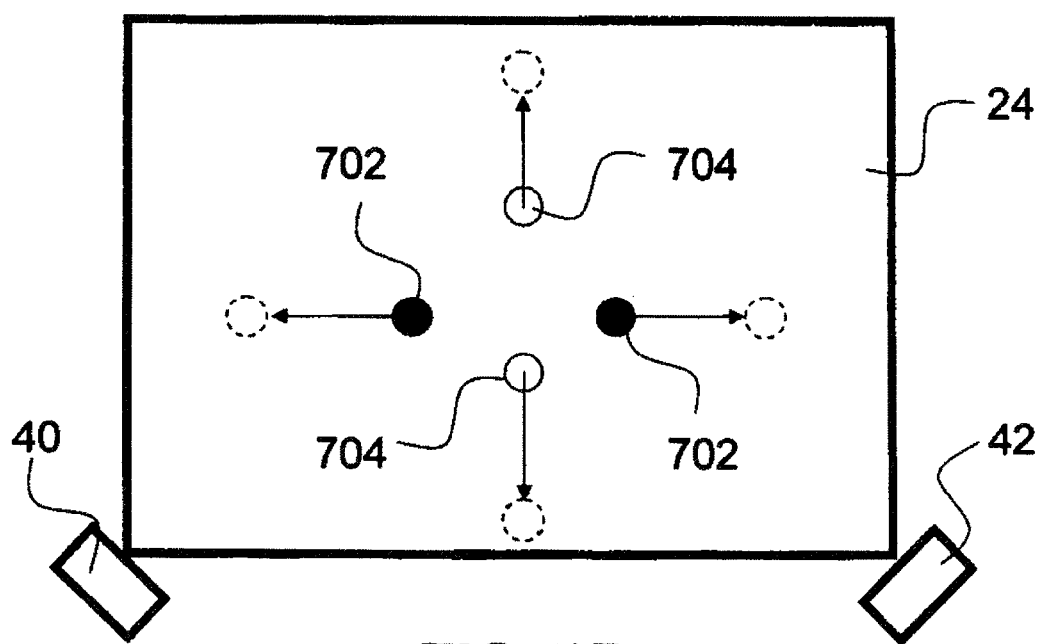
FIG. 7B is an exemplary view showing the real and imaginary pointer location triangulation solutions during input of the gesture of FIG. 7A.

FIG. 7A shows a zoom gesture where two pointers 700 (in this case, one finger from each hand of a user) are brought into contact with an object (not shown) displayed on the display surface 24 and then moved apart. FIG. 7B shows the real pair of touch points 702 and the imaginary pair of touch points 704 determined during triangulation. Since all four touch points 702 and 704 move away from each other, it is not necessary to determine which pair of touch points is real and which pair of touch points is imaginary in order to recognize the zoom gesture. When the zoom gesture is performed with the pointers moving towards one another, all four touch points 702 and 704 move towards one another so again, it is not necessary to determine which pair of touch points is real and which pair of touch points is imaginary in order to recognize the zoom gesture.

Figure 8A:
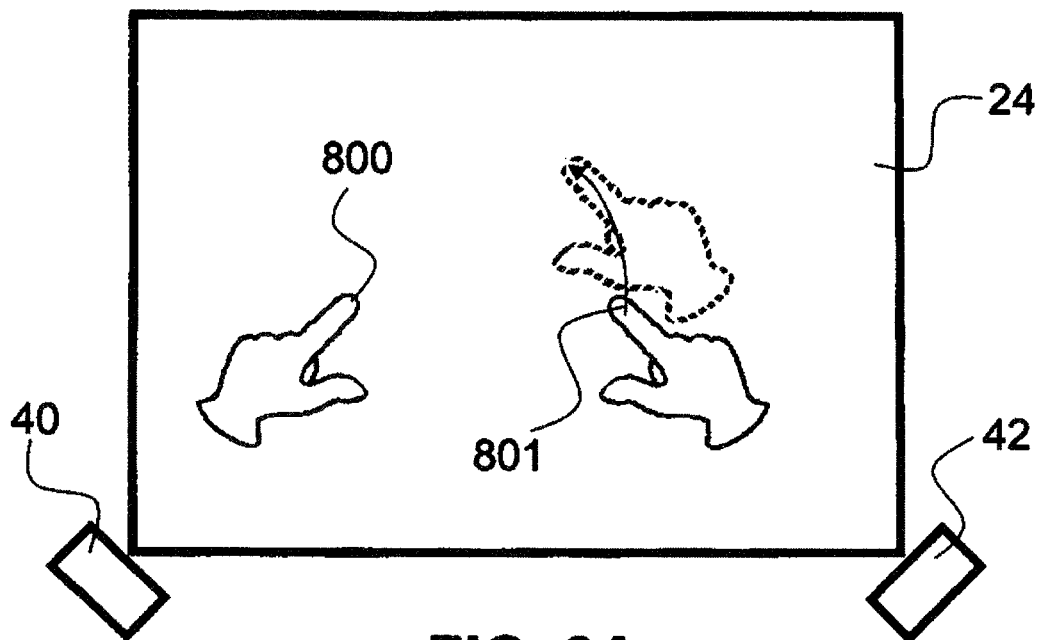
FIG. 8A is an exemplary view of yet another gesture made using two pointers interacting with the display surface of the interactive input system of FIG. 1.
Figure 8B:
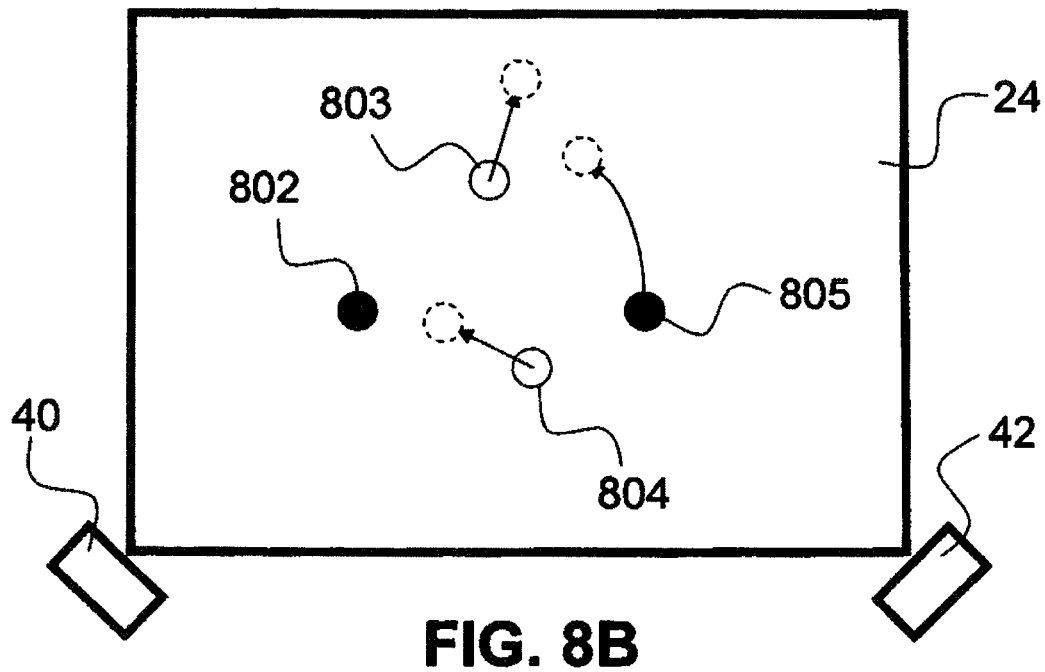
FIG. 8B is an exemplary view showing the real and imaginary pointer location triangulation solutions during input of the gesture of FIG. 8A.

FIG. 8A shows a rotation gesture where two pointers 800 and 801 (in this case, one finger from each hand of a user) are brought into contact with an object (not shown) displayed on the input surface 24. Pointer 800 remains stationary on the object, acting as an anchor while pointer 801 is rotated around pointer 800. FIG. 8B shows the stationary touch point 802 and three moving real and imaginary touch points 803, 804, 805 determined during triangulation. The stationary touch point 802 can be readily recognized as the anchor. The imaginary touch points 803 and 804 can be readily distinguished from the real touch point 805 due to the fact that the imaginary touch points 803 and 804 move toward or away from the stationary touch point 802, whereas the touch point 805 moves in an arc around the stationary touch point 802.

Figure 9A:
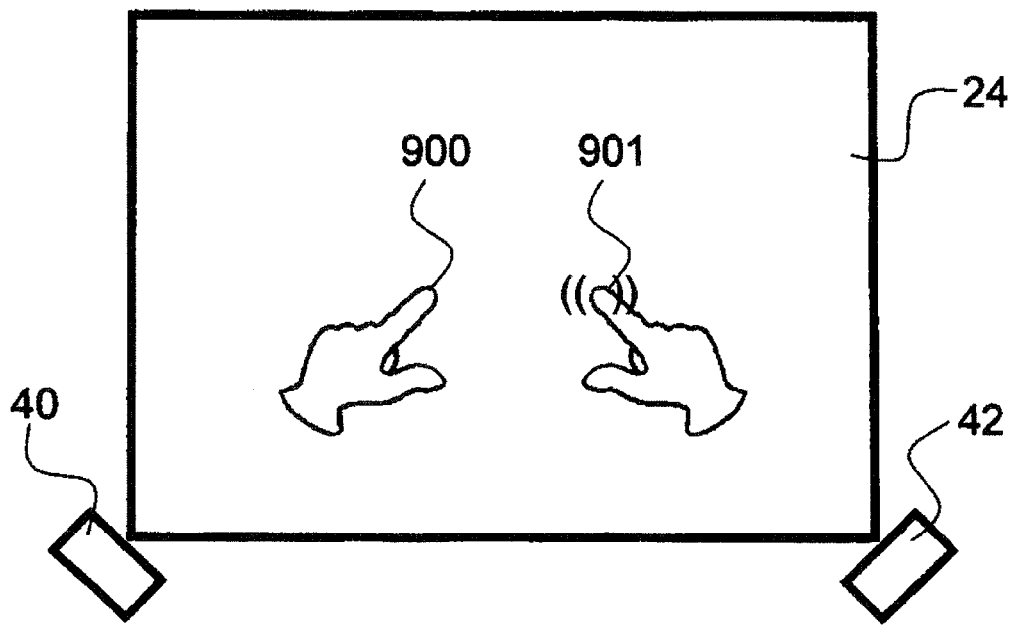
FIG. 9A is an exemplary view of yet another gesture made using two pointers interacting with the display surface of the interactive input system of FIG. 1.
Figure 9B:
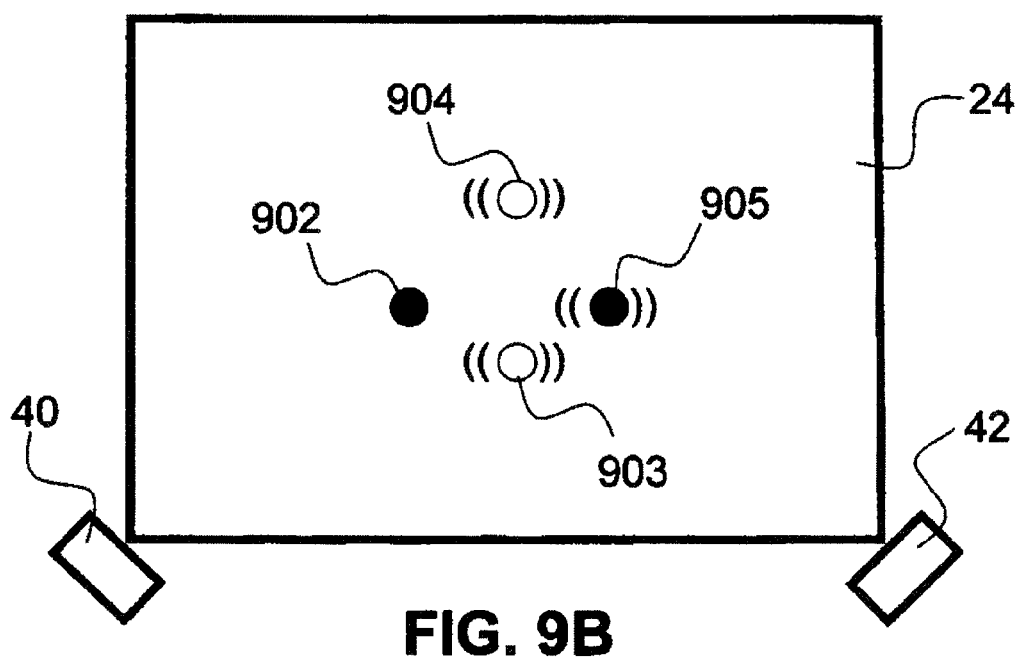
FIG. 9B is an exemplary view showing the real and imaginary pointer location triangulation solutions during input of the gesture of FIG. 9A.

FIG. 9A shows a right-click gesture where a pointer 900 (in this case, one finger from one hand of a user) is brought into contact with the display surface 24, while pointer 901 (in this case, one finger from the other hand of the user) makes successive contacts with the display surface 24 to the right of pointer 900. FIG. 9B shows a stationary touch point 902 and three intermittent real and imaginary touch points 903, 904, and 905 that are determined during triangulation. As the three intermittent touch points 903, 904 and 905 are all to the right of the stationary touch point 902, it is not necessary to determine which pair of touch points is real and which pair of touch points is imaginary in order to recognize the right-click gesture.

Difficulties in classification arise when an entire hand or multiple fingers from a user's hand are used as a single pointer. When an entire hand is used as a single pointer, during triangulation multiple possible touch point locations for each finger of the hand contacting the display surface 24 are generated. To deal with these scenarios, when an entire hand is used to contact the display surface, all real and imaginary touch points calculated during triangulation in response to the hand contact are clustered together to form a single large touch region. In the case where two separate hands are used as two individual pointers to interact with the display surface 24, all real and imaginary touch points that are calculated during triangulation are also clustered to form a single large touch region.

Figure 10A:
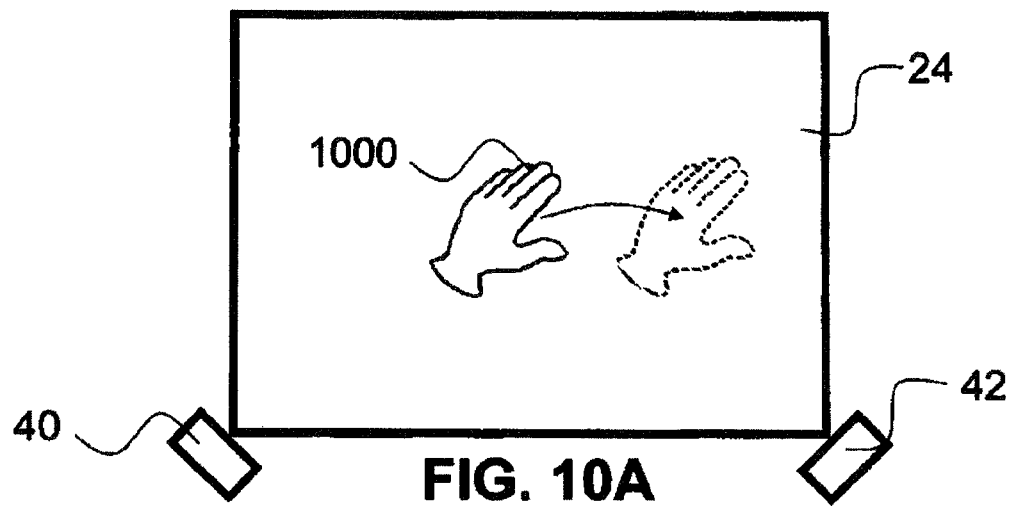
FIG. 10A is an exemplary view of a gesture made using an entire hand interacting with the display surface of the interactive input system of FIG. 1.
Figure 10B:
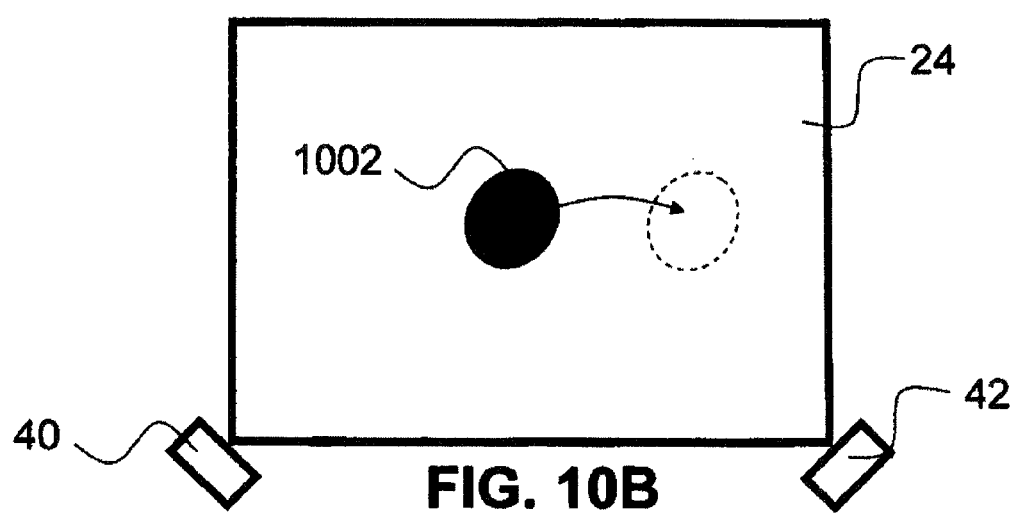
FIG. 10B is an exemplary view showing the touch region of the hand palm down on the display surface during input of the gesture of FIG. 10A.
Figure 10C:
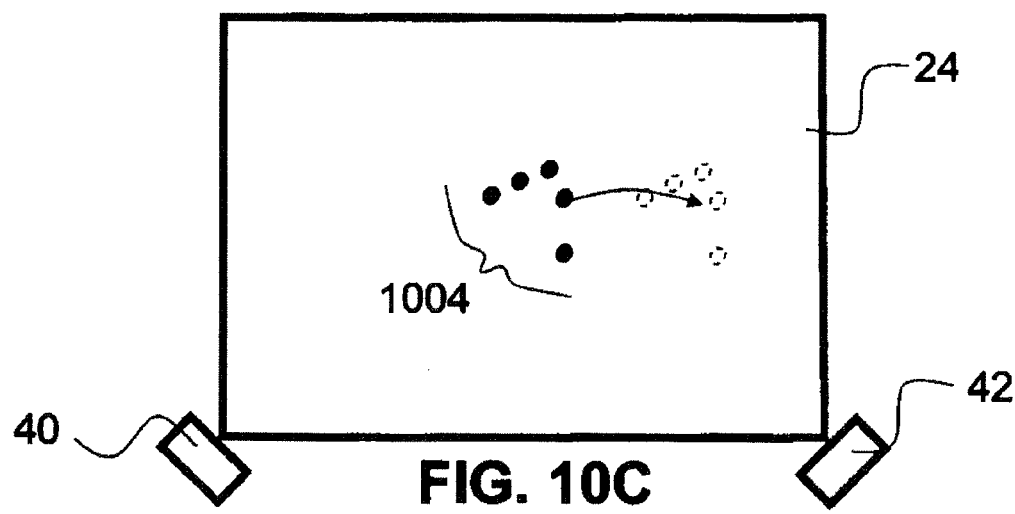
FIG. 10C is an exemplary view showing the touch regions of the hand palm up on the display surface during input of the gesture of FIG. 10A.

FIGS. 10A to 12C show various gestures made using hands interacting with the display surface 24 together with the touch region or touch points on the display surface 24 during input of the gestures depending on whether the hands are palm up or palm down. For example, FIG. 10A shows a swipe gesture made using an entire hand 1000 that is brought into contact with the display surface 24 and then moved across the display surface 24 in generally one direction in a sweeping motion. FIG. 108 shows movement of the touch region 1002 on the display surface when the palm of the hand 1000 is down during gesture input. As can be seen, the touch region 1002 is much bigger than the diameter of an average finger. FIG. 10C shows movement of the cluster of touch points 1004 on the display surface 24 when the palm of the hand 1000 is up during gesture input and only the fingertips of the hand interact with the display surface 24. The cluster of touch points 1004 does not necessarily include all five fingers since each finger may interact with the display surface 24 with different pressure or some fingers may be close enough to other fingers to look like one merged touch point. The cluster of touch points 1004 is not resolved into individual touch points but rather is treated as one large touch region in order to reduce processing load and increase response time.

Figure 11A:
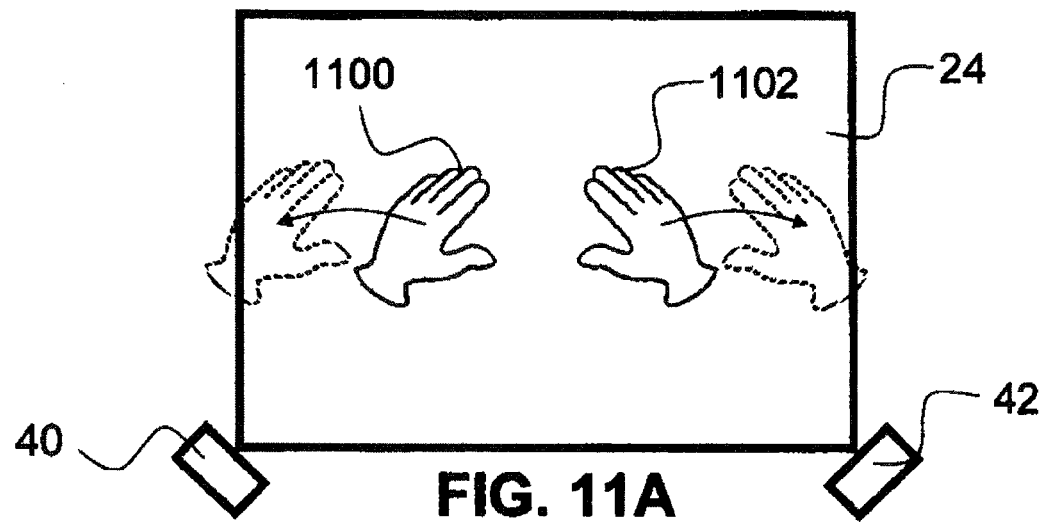
FIG. 11A is an exemplary view of another gesture made using two hands interacting with the display surface of the interactive input system of FIG. 1.
Figure 11B:
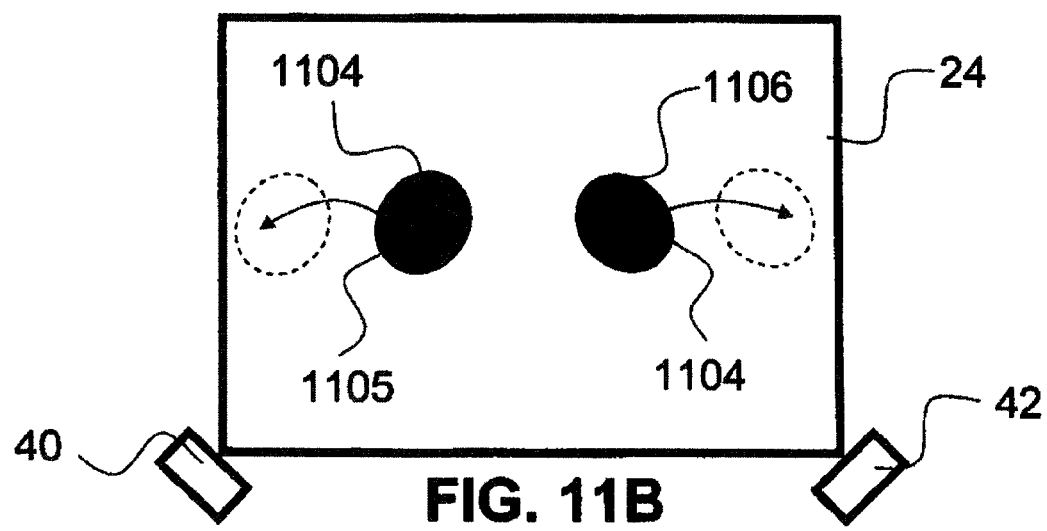
FIG. 11B is an exemplary view showing the touch region of the hand palm down on the display surface during input of the gesture of FIG. 11A.
Figure 11C:
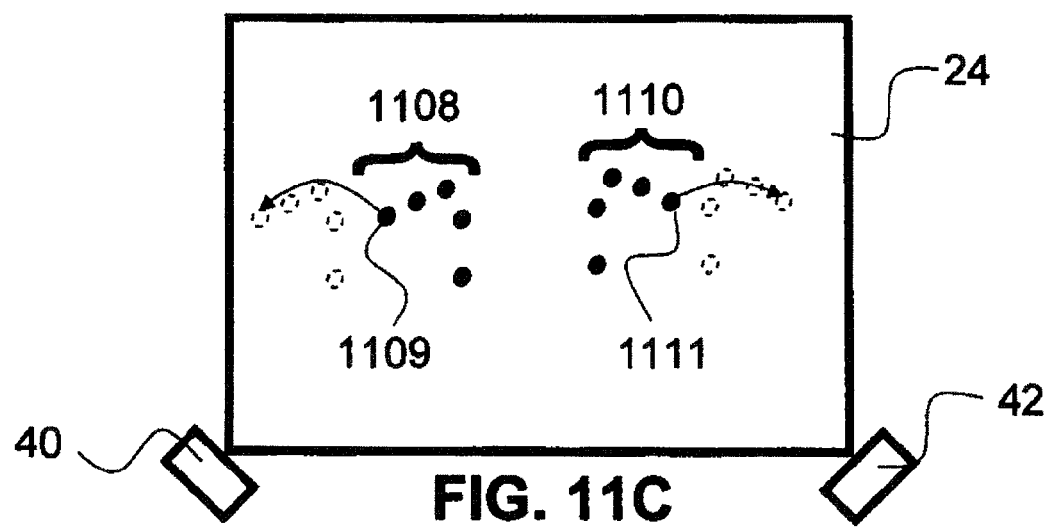
FIG. 11C is an exemplary view showing the touch region of the hand palm up on the display surface during input of the gesture of FIG. 11A.

FIG. 11A shows a zoom gesture made using two separate hands 1100 and 1102 brought into contact with the display surface 24 and then moved away from one another (or toward one another). FIG. 11B shows movement of the touch regions on the display surface 24 when the palms of the hands 1100 and 1102 are down. FIG. 11C shows movement of the clusters of touch points 1108 and 1110 on the display surface 24 when the palms of the hands 1100 and 1102 are up and only the fingertips are contacting the display surface 24. The clusters are not resolved into separate touch points but rather are treated as a large touch region thereby reducing the processor load and increasing response time. Only the extreme sides of the large touch region are of concern. In FIG. 11B, if the extreme left 1105 of touch region 1104 and the extreme right 1107 of the touch region 1106 move away from one another (or toward one another), the zoom gesture is recognized. Similarly, in FIG. 11C, if the extreme left 1109 of the cluster of touch points 1108 and the extreme right 1111 of the cluster of touch points 1110 move towards one another (or toward one another), the zoom gesture is recognized.

Figure 12A:
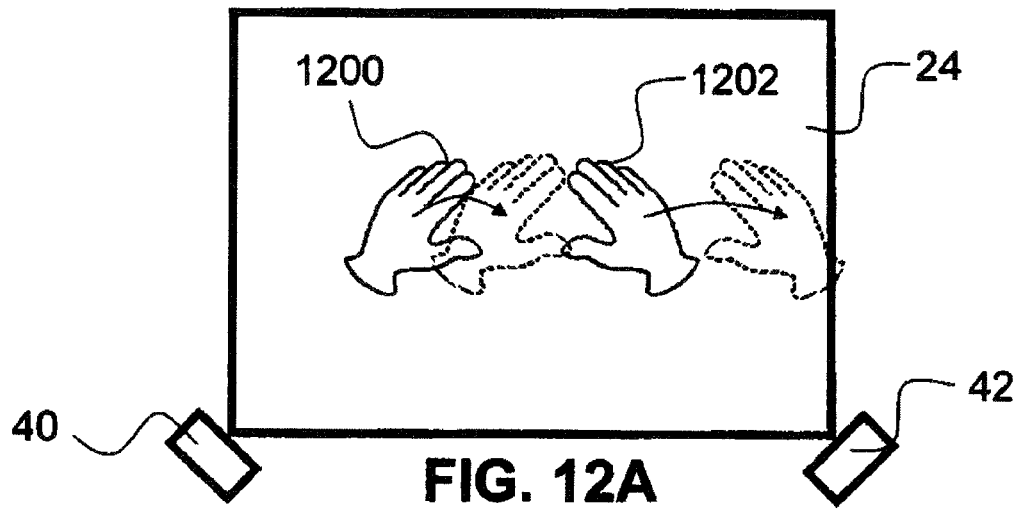
FIG. 12A is an exemplary view of yet another gesture made using two hands interacting with the display surface of the interactive input system of FIG. 1.
Figure 12B:
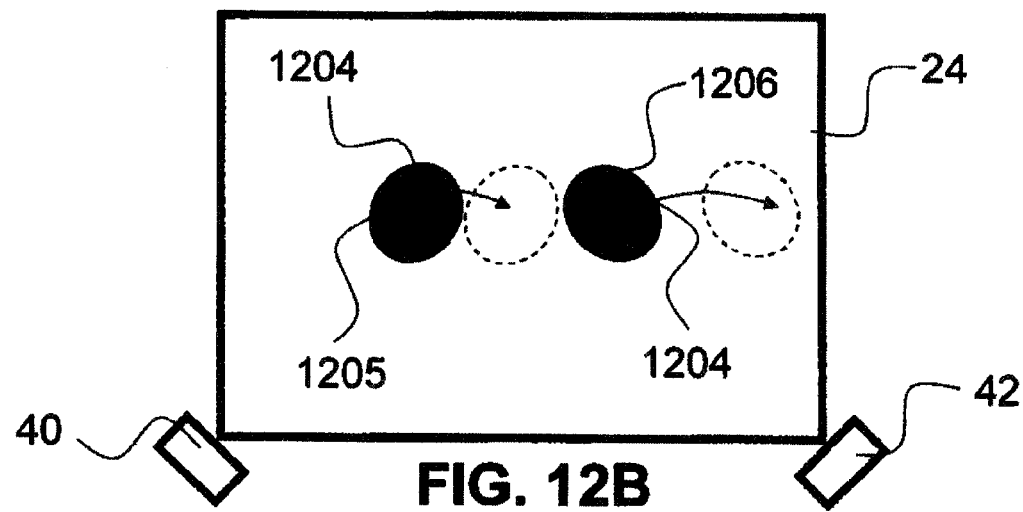
FIG. 12B is an exemplary view showing the touch region of the hand palm down on the display surface during input of the gesture of FIG. 12A.
Figure 12C:
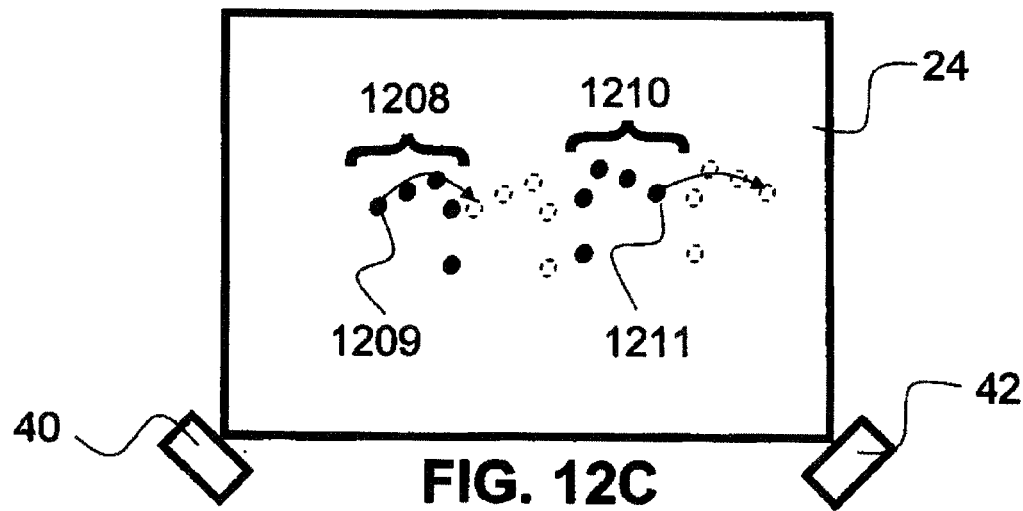
FIG. 12C is an exemplary view showing the touch region of the hand palm up on the display surface during input of the gesture of FIG. 10A.

FIG. 12A shows a pan gesture made using two separate hands 1200 and 1202 that are brought into contact with the display surface 24 and then moved in the same direction while generally maintaining the spacing between the hands. FIG. 12B shows movement of the touch regions 1204 and 1206 on the display surface 24 when the palms of the hands 1200 and 1202 are down. FIG. 12C shows movement of the clusters of touch points 1208 and 1210 on the display surface 24 when the palms of the hands 1200 and 1202 are up and only the fingertips are contacting the display surface 24. The clusters are not resolved into separate touch points but rather are treated as a large touch region thereby reducing the processor load and increasing response time. Only the extreme sides of the large touch region are of concern. In FIG. 12B, if the extreme left 1205 of the touch region 1204 and the extreme right 1207 of the touch region 1206 move in one direction, maintaining approximately the same distance apart from one another, the pan gesture is recognized. Similarly, in FIG. 12C, if the extreme left 1209 of the cluster of touch points 1208 and the extreme right 1211 of the cluster of touch points 1210 move in one direction, maintaining approximately the same distance apart from one another, the pan gesture is recognized.

As one of skill in the art will appreciate, the above discussion highlights only a few examples of gestures that can be made using multiple pointers or multiple hands and that other gestures may be recognized.

Figure 13A:
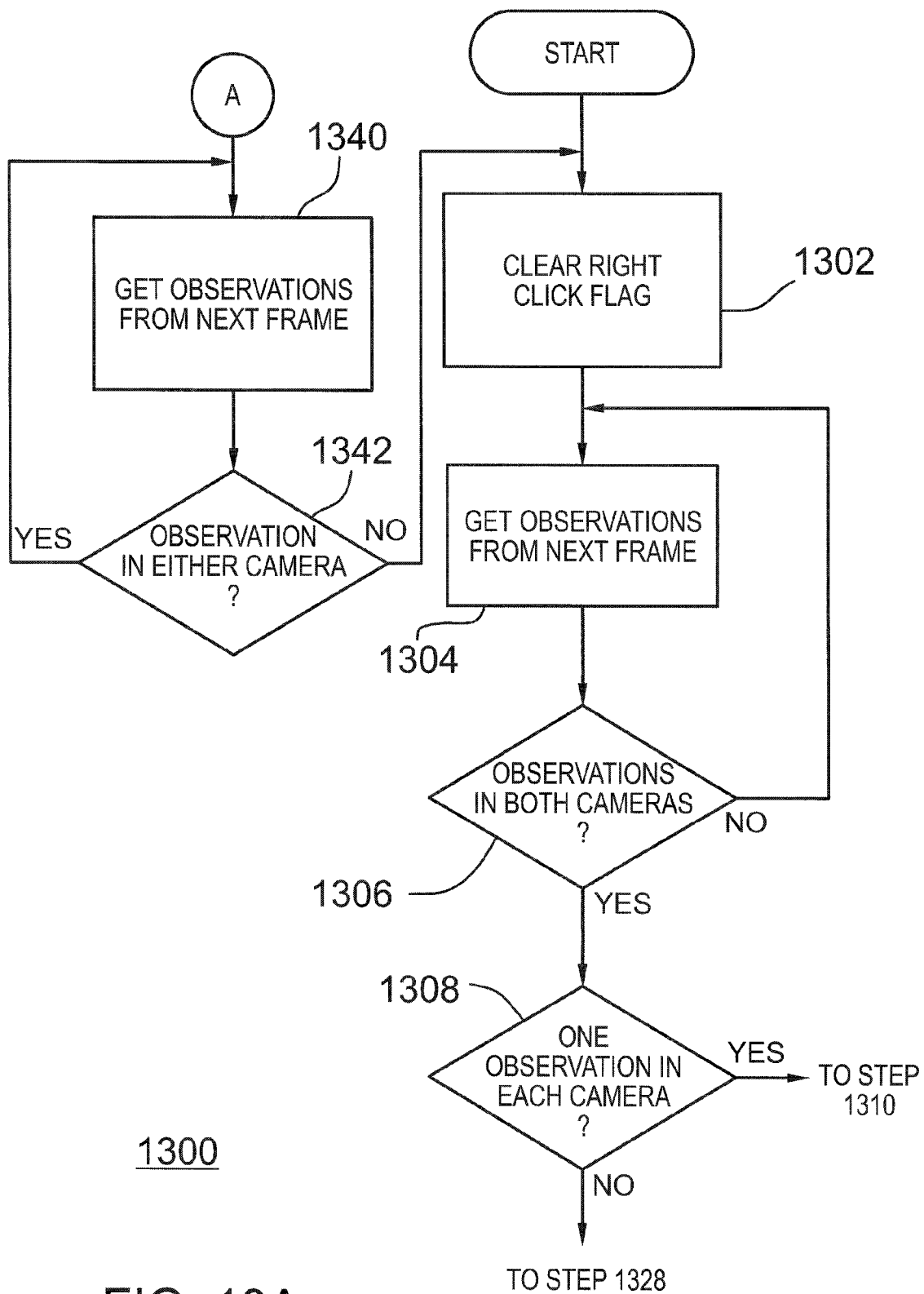
FIGS. 13A, 13B and 13C combine to form a flowchart depicting a classification routine executed by the master controller of FIG. 3.
Figure 13B:
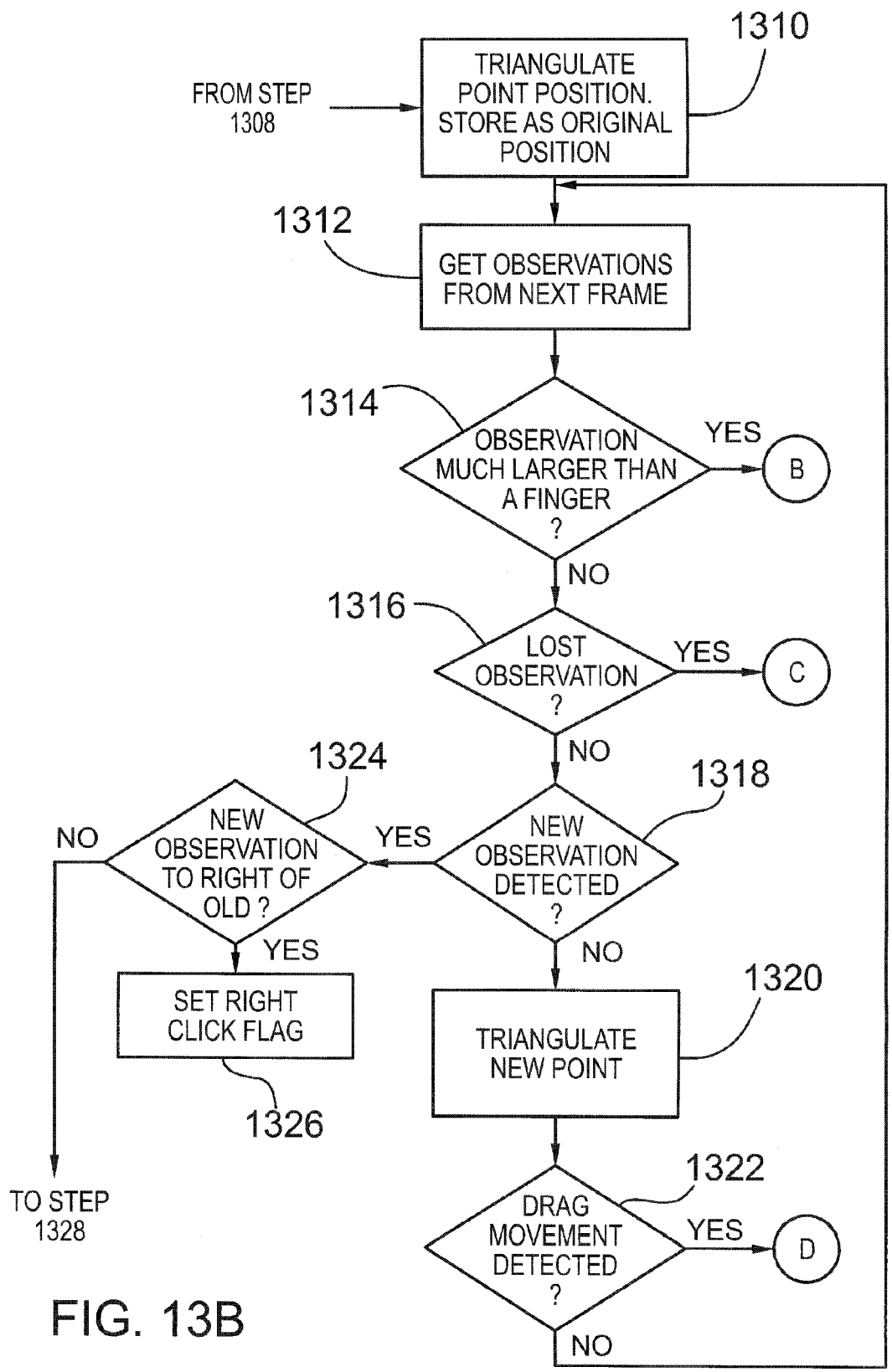
Figure 13C:
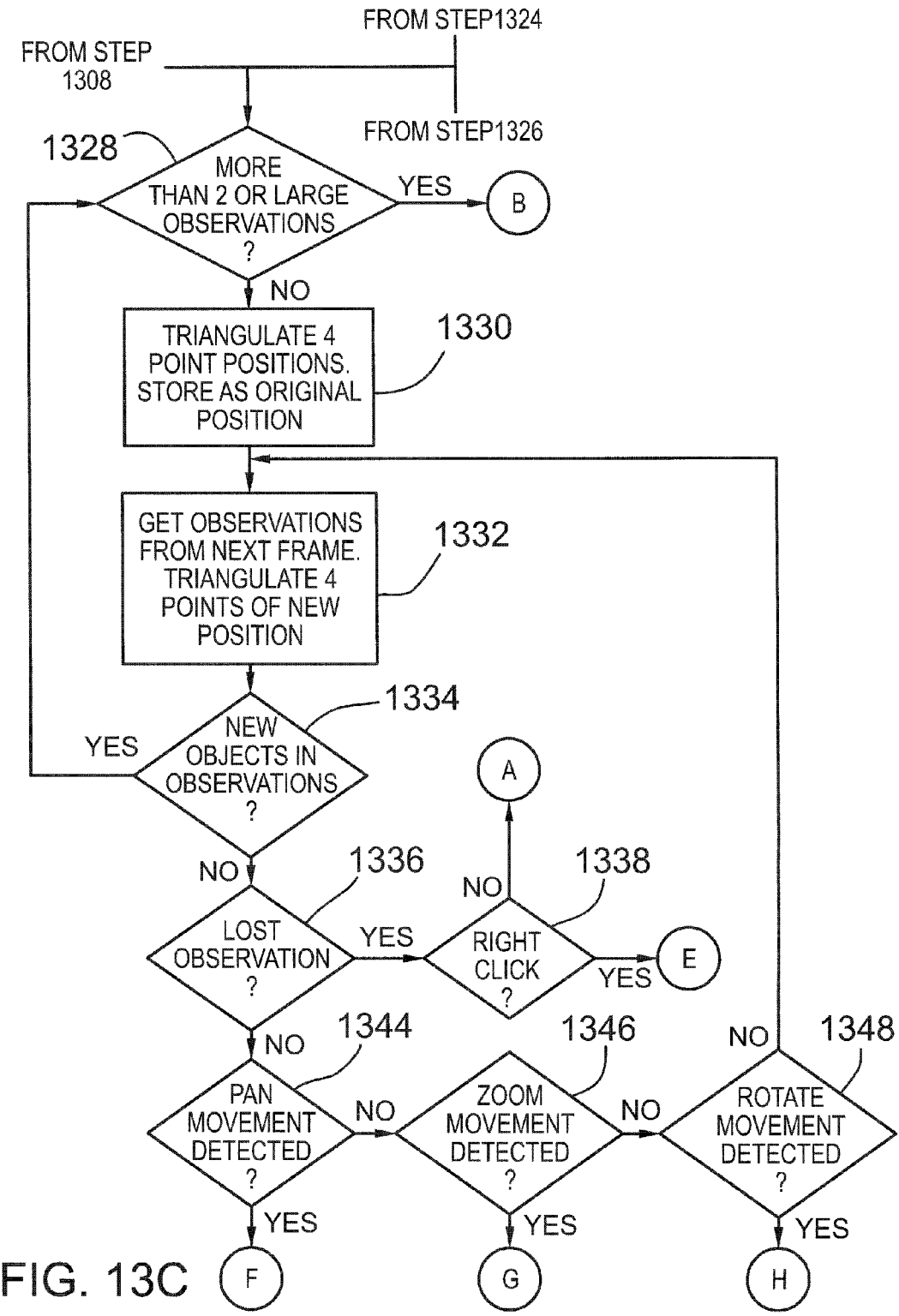

FIGS. 13A, 13B and 13C combine to form a flowchart showing the classification routine 1300 executed by the master controller 30 that is used to recognize gestures, such as those described above, input by a user or users using multiple fingers, or entire hands in contact with the display surface 24. As can be seen, initially, in step 1302, the flag for a right-click gesture is cleared. In step 1304, the observation(s) generated by the imaging devices 40 and 42 following processing of captured image frames are acquired. In step 1306, a check is made to determine if one or more observation from each imaging device exists. If one or more observation from only one imaging device exists, which may occur when a pointer is initially approaching the display surface 24 and is seen by only one imaging device, the procedure reverts back to step 1304 so that the observation(s) generated by the imaging devices 40 and 42 following processing of next captured image frames are acquired.

In step 1306, if one or more observation from each imaging device exists, a check is made in step 1308 to determine if only one observation from each imaging device exists. If only one observation from each imaging device exists, then in step 1310, the center of the bounding box defined by the intersecting lines of the overlapping observations and hence the pointer location or touch point in (x,y) coordinates is calculated using triangulation. Triangulation is performed in physical measurement units such as centimeters starting at a designated origin, for example, the top left corner of the assembly 22.

Once the position of the touch point is determined an approximation of the size of the touch point is calculated by determining the area of the bounding box. The units of the size measurement are the same as the units of triangulation. The touch point location and size are then stored as original pointer position information for later reference to see if any change in the position of the touch point pointer occurs.

In step 1312, the observations generated by the imaging devices 40 and 42 following processing of the next image frames are acquired. In step 1314, the size of the bounding box defined by the intersecting lines of the overlapping observations that correspond to the touch point identified during processing of the previous observations is compared with a threshold value to determine if the size of the bounding box is much larger than a typical finger. If the size of the bounding box is much larger than an average finger, for example approximately 4 cm in diameter, a hand gesture classification routine (labeled B) is executed as will be described. If the size of the bounding box has not changed or is not larger than an average finger, then in step 1316, it is determined if the touch point has been lost. If the touch point has been lost, a lift of the pointer from the display surface 24 is recognized indicating a left-click and a left-click gesture routine (labeled C) is executed as will be described. If the touch point has not been lost, then in step 1318, it is determined if the observations signify that more than one touch point exists and whether the original touch point was possibly part of a multi-touch gesture or possibly a right-click gesture. If the observations do not signify that more than one touch point exists, then in step 1320, the center of the bounding box and hence the new pointer position is calculated using triangulation. In step 1322, it is then determined if a drag gesture was performed by examining the current and previous touch point locations. If a change in touch position is detected, then a drag gesture routine (labeled D) is executed as will be described. If a change in touch position is not detected, the classification routine returns to step 1312.

If at step 1318 the observations signify that more than one touch point exists, then in step 1324, it is determined if the new touch point occurred to the right of the original touch point. If the new touch point occurred to the right of the original touch point, a potential right-click gesture is recognized and the right-click flag is set in step 1328. If the new potential touch point did not occur to the right of the original touch point or after the right-click flag has been set, the classification routine proceeds to step 1328.

If at step 1308, more than one observation from each imaging device exists, then at step 1328, the bounding boxes representing the touch points are examined to determine if any of the bounding boxes are very large—for example, larger than the average finger width of approximately 4 cm—or whether bounding boxes representing more than two touch points exist. If bounding boxes representing more than two touch points are determined or if a large bounding box is determined, the classification routine recognizes that a cluster gesture has been initiated and the hand gesture classification routine B is executed. If bounding boxes representing two touch points are determined and neither bounding box has a size greater than 4 cm in diameter, then in step 1330, the gesture is recognized as a two-finger gesture and all four possible touch points, including the real pair of touch points and the imaginary pair of touch points as shown in FIG. 4, are triangulated. This resulting triangulation set is stored as an original position and is used to compare to subsequent triangulation sets to determine if two-finger gestures are being input.

As mentioned previously with reference to FIG. 5, it is possible for one imaging device to see two pointers, while the other imaging device sees only one pointer. This may occur if there is an obstruction in the sightline one of the imaging devices or if the two pointers are aligned in the view of one of the imaging devices so as to appear as a single pointer. In this case, when the original triangulation set is calculated, the observation of corresponding to the single pointer is treated as two potential touch points at the same position. As a result, during triangulation, four touch points will be generated, but two touch points will be redundant.

In step 1332, observations generated by the imaging devices 40 and 42 following processing of the next image frames are acquired and the next four touch point positions are triangulated. The results for this next triangulation set are then stored as the next position. In step 1334, it is determined if the observations signify new touch points. If the observations signify new touch points, the classification routine 1300 returns to step 1328. If the observations do not signify any new touch point, then in step 1336, it is determined if any of the touch points has been lost. If a touch point has been lost, then in step 1338, it is determined whether the rightmost touch point was lost and if the right-click flag is set. If the rightmost touch point was lost and the right-click flag is set, then a right-click gesture routine (labeled E) is executed as will be described.

If the right-click flag is not set or if the rightmost touch point was not lost, it is determined that a gesture has been aborted and no gesture is recognized. The classification routine 1300 then proceeds to step 1340 and the observations generated by the imaging devices 40 and 42 following processing of the next image frames are acquired. In step 1342, it is then determined whether either imaging device 40 or 42 sees the pointer and returns an observation. If the pointer is seen by either imaging device, the classification routine 1300 returns to step 1340. If the pointer is no longer seen by the imaging devices 40 and 42, the classification routine returns to step 1302. This forces the user to lift his or her fingers between gestures as the classification routine 1300 will not proceed until there are no observations of pointers. This inhibits transients that occur as the user lifts his or her fingers from the display surface 24, from being interpreted as other gestures.

Figure 6B:
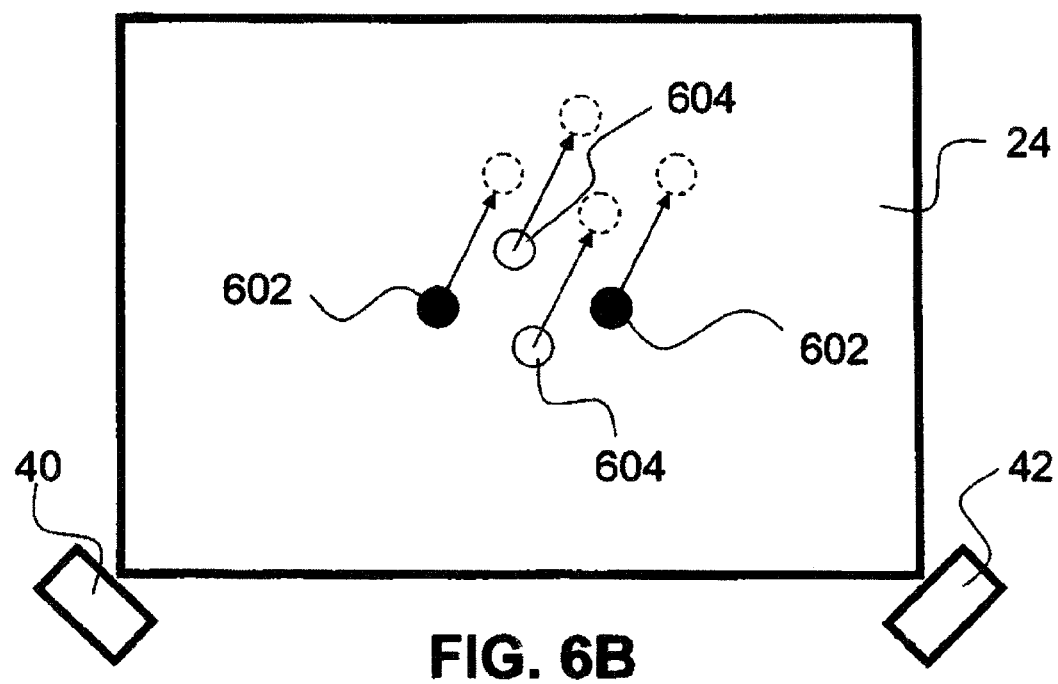
FIG. 6B is an exemplary view showing the real and imaginary pointer location triangulation solutions during input of the gesture of FIG. 6A.

In step 1336, if no touch points are lost, then in step 1344, movement of the touch points is examined to determine whether a pan gesture has been made as shown in FIGS. 6A and 6B. If a pan gesture is detected, then a pan gesture routine (labeled F) is executed as will be described. If a pan gesture is not detected, then in step 1346, movement of the touch points is examined to determine whether a zoom gesture has been made as shown in FIGS. 7A and 7B. If a zoom gesture is detected, a zoom gesture routine (labeled G) is executed as will be described. If a zoom gesture is not detected, then in step 1348, movement of the touch points are examined to determine whether a rotation gesture has been made as shown in FIGS. 8A and 8B. If a rotation gesture is detected, then a rotation gesture routine (labeled H) is executed as will be described. If a rotation gesture is not detected, then the classification routine returns to step 1332.

Figure 14:
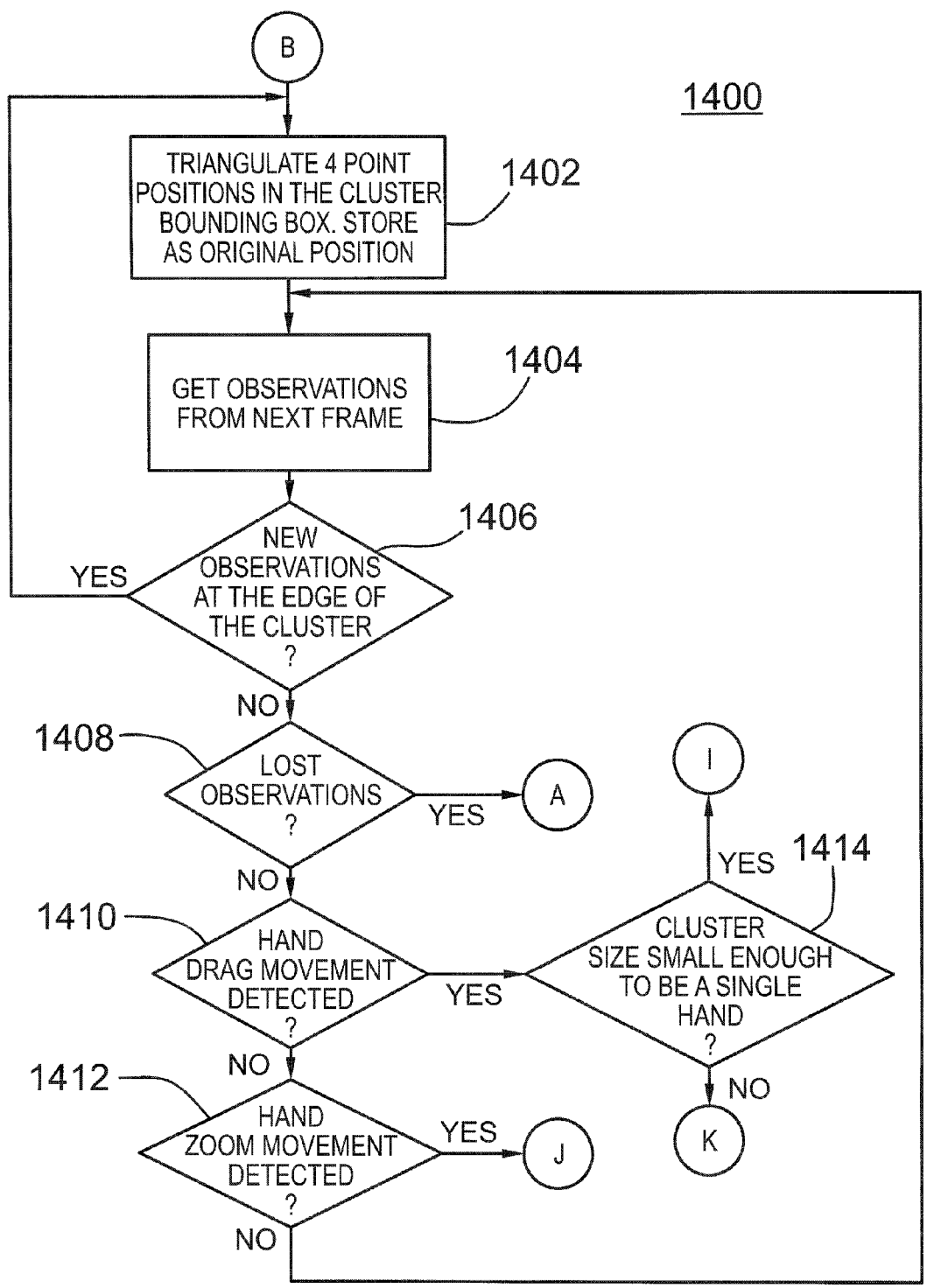
FIG. 14 is a flowchart depicting a hand gesture classification routine executed by the master controller of FIG. 3.

FIG. 14 is a flowchart depicting the hand gesture classification routine employed at step B in FIG. 13 and generally identified as numeral 1400. At step 1402, because the size of the touch point is much greater than the average width of an average finger, or because more than two touch points have been found, a hand gesture is recognized. Whether the touch point is the result of a cluster of pointers or an entire hand palm-down in contact with the display surface 24 is irrelevant since individual touch points are not resolved. Instead, the extreme left boundaries and the extreme right boundaries (alternatively, points within the boundary edges may be used, for example, a point 1 cm within the boundary) of the large touch point are triangulated, creating four triangulated touch points that form a polygon or a bounding box surrounding the large touch point. The bounding box is stored as the original position of the large touch point.

In step 1404, observations generated by the imaging devices 40 and 42 following processing of the next image frames are acquired. In step 1406, it is determined whether the observations signify any new touch points appearing at the edges of the bounding box which could not be accounted for by reasonable movement of the pointer(s) between the image frames. If the observations signify such a new touch point, it is assumed that the original touch point position was calculated with transient data and the hand gesture classification returns to step 1402 to start over. If the observations do not signify any new touch points, then in step 1408, it is determined if the touch point has been lost. If the touch point has been lost, then it is assumed that the user's hand lifted from the display surface 24 without performing a gesture and no gesture is recognized. The hand gesture classification routine 1400 is then exited and the classification routine returns to step 1340.

In step 1408, if the touch point has not been lost, then in step 1410, movement of the touch point is examined to determine if a drag gesture has been made. A drag gesture is detected when all four triangulation points of the bounding box move more than a certain threshold of approximately 4 cm in roughly the same direction, plus or minus approximately 45°. If a drag gesture is detected, then in step 1414, a check is made to determine if the touch point size is small enough to be made by a single hand. The threshold size for a single hand is approximately 4 cm. If the touch point size is small enough to be a single hand, then a hand swipe gesture routine (labeled I) is executed as will be described. If the touch point size is not small enough to be made by a single hand, then a hand pan gesture routine (labeled K) is executed as will be described.

If a drag gesture is not detected in step 1410, then in step 1412, movement of the touch points are examined to determine if a zoom gesture has been made. A zoom gesture is detected when the extreme left and extreme right triangulation points of the bounding box both move more than a certain threshold of approximately 4 cm apart from one another for enlarging an object presented on the display surface 24, or together for shrinking an object presented on the display surface 24. If a zoom gesture is detected, then a hand zoom gesture routine (labeled J) is executed as will be described. If a zoom gesture is not detected, then the hand gesture classification routine 1400 returns to step 1404.

FIG. 15 is a flowchart showing the left-click gesture routine 1500 (labeled C in FIG. 13). In step 1502, a left-click mouse down or pointer down event is reported at the original position to the general purpose computing device 32 by the master controller 30. At step 1504, a mouse up or pointer up event is reported to the general purpose computing device 32 by the master controller 30. The left click gesture routine 1500 is then exited and the classification routine returns to step 1340.

FIG. 16 is a flowchart showing the right-click gesture routine 1600 (labeled E in FIG. 13). In step 1602, since the rightmost touch point was lost and the right-click flag is set, a right-click mouse down or pointer down even is reported at the rightmost touch point to the general purpose computing device 32 by the master controller 30. In step 1604, a mouse up or pointer up event is reported to the general purpose computing device 32 by the master controller 30. The right-click gesture routine 1600 is then exited and the classification routine returns to step 1340.

Figure 17:
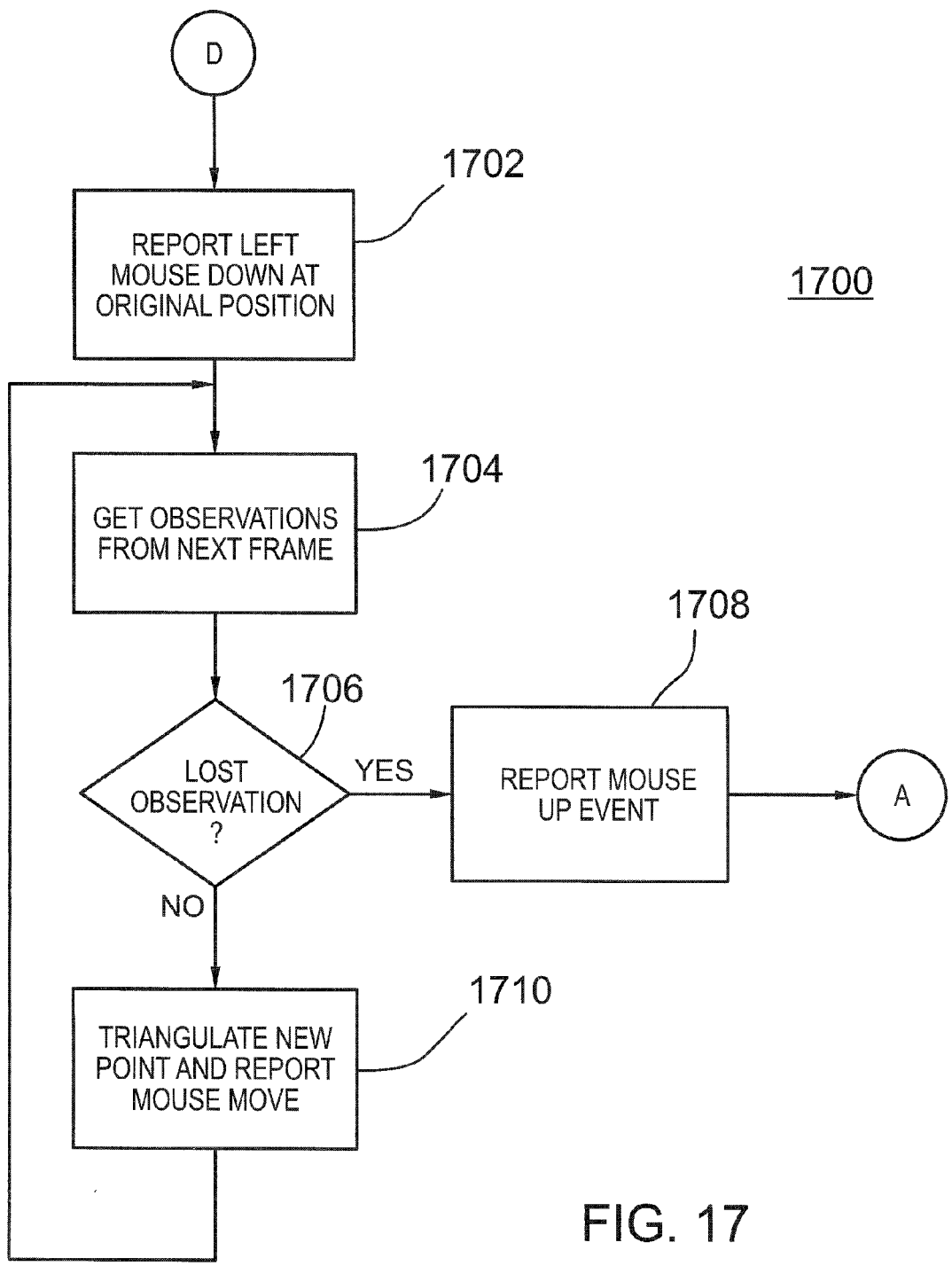
FIG. 17 is a flowchart of a drag gesture routine executed by the master controller of FIG. 3.

FIG. 17 is a flowchart showing the drag gesture routine 1700 (labeled D on FIG. 13). In step 1702, since a drag gesture was detected, a left-click mouse down or pointer down event is reported at the original position to the general purpose computing device 32 by the master controller 30. In step

1704, observations generated by the imaging devices 40 and 42 following processing of the next frame are acquired. In step 1706, it is determined whether the touch point has been lost. If the touch point is lost, then in step 1708, a mouse up or pointer up event is reported to the general purpose computing device 32 by the master controller 30. The drag gesture routine 1700 is then exited and the classification routine returns to step 1340. If the touch point has not been lost, then in step 1710, the new touch point position is triangulated and a mouse move or pointer move event is reported to the general purpose computing device 32 by the master controller 30. The drag gesture routine 1700 then returns to step 1704. The drag gesture routine 1700 only ends when one or both imaging devices loses sight of a pointer.

Figure 18:
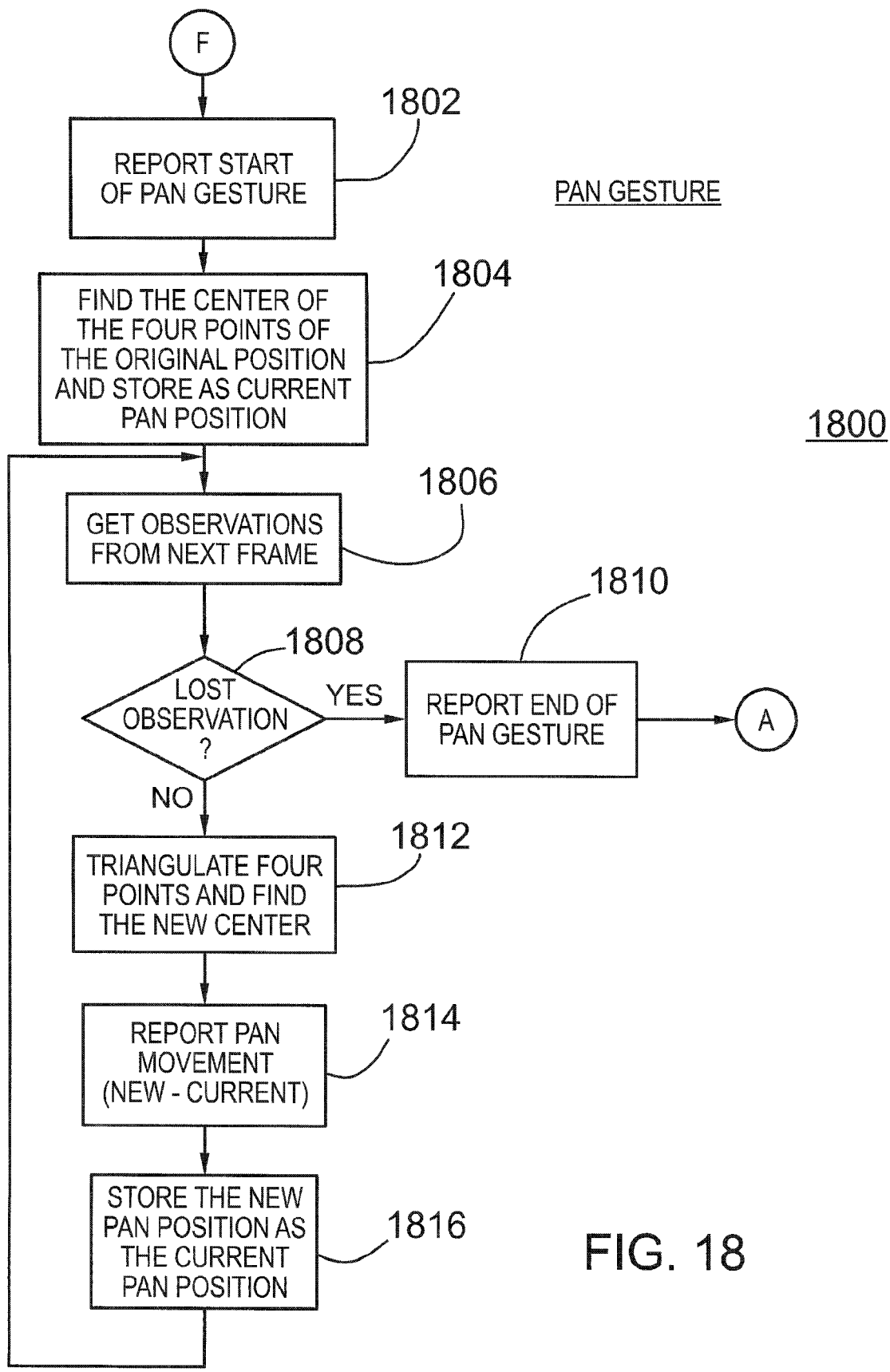
FIG. 18 is a flowchart of a pan gesture routine executed by the master controller of FIG. 3.

FIG. 18 shows the pan gesture routine 1800 (labeled F on FIG. 13). In step 1802, since a pan gesture movement was detected, a pan gesture start is reported to the general purpose computing device by the master controller 30. In step 1804, the center of the original triangulation set is calculated and stored as the start pan position. In this embodiment, the center of the two finger pan gesture is calculated by adding the positions of the leftmost and rightmost observations generated by each imaging device 40 and 42 and dividing by two. The two resulting centers are triangulated as a single point on the display surface 24 to represent the center of the two pointers or fingers. Pan distance is measured from this triangulated center. In step 1806, observations generated by the imaging devices 40 and 42 following processing of the next frame are acquired. In step 1808, it is determined whether the touch points have been lost. If the touch points are lost, then in step 1810, an end pan is reported to the general purpose computing device 32 by the master controller 30. The pan gesture routine 1800 is then exited and the classification routine to step 1340. If the touch points have not been lost, then in step 1812, a new triangulation set is calculated for the new position of the touch points and the new center is calculated from the new triangulation set. In step 1814, a pan movement from the original triangulation set position to the new triangulation set position is reported to the general purpose computing device 32 by the master controller 30. In step 1816, the new pan position is used to replace the start pan position. The pan gesture routine 1800 then returns to step 1806. The pan gesture routine 1800 only ends when one or both imaging devices loses sight of a pointer.

Figure 19:
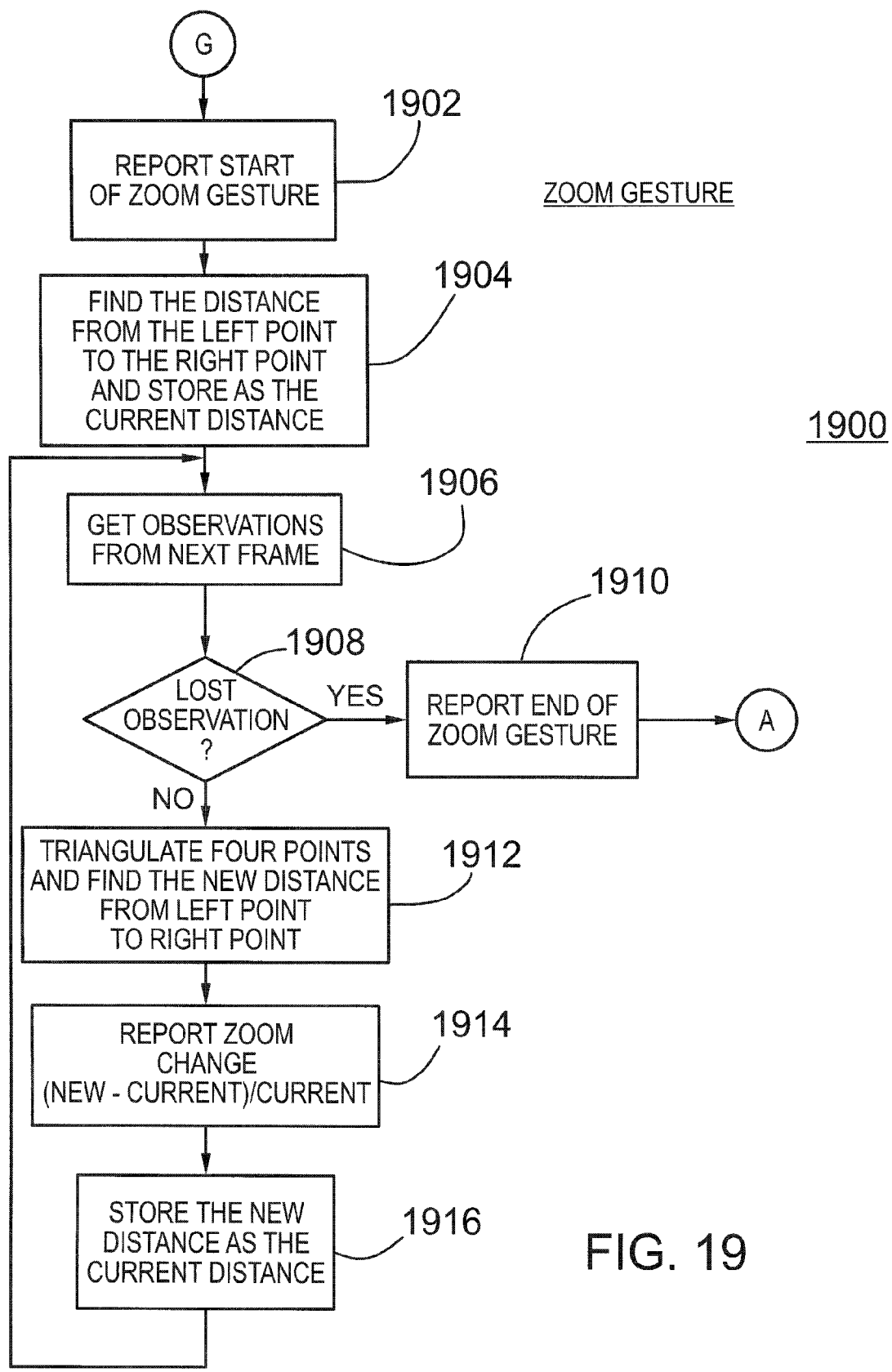
FIG. 19 is a flowchart of a zoom gesture routine executed by the master controller of FIG. 3.

FIG. 19 shows the zoom gesture routine 1900 (labeled G on FIG. 13). In step 1902, since a zoom gesture movement was detected, a zoom gesture start is reported to the general purpose computing device by the master controller 30. In step 1904, the distance from the leftmost triangulation point to the rightmost triangulation point of the triangulation set is calculated and stored as the current distance. In step 1906, observations generated by the imaging devices 40 and 42 following processing of the next frame are acquired. In step 1908, it is determined whether the touch points have been lost. If the touch points have been lost, then in step 1010, the zoom gesture is ended and reported to the general purpose computing device by the master controller 30. The zoom gesture routine 1900 is then exited and the classification routine returns to step 1340.

If the touch points have not been lost, then in step 1912, a new triangulation set is calculated for the new position of the touch points and a new distance is calculated from the new triangulation set. In step 1914, the change in zoom from the current distance to the new distance is reported to the general purpose computing device 32 by the master controller 30. In step 1916, the current distance is used to replace the new distance. The zoom gesture routine 1900 then returns to step 1906. The zoom gesture routine 1900 only ends when one or both imaging devices loses sight of a pointer. When two touch points contact one another or are brought near each other during the zoom gesture, the interactive input system 20 continues to identify the two touch points instead of creating a single touch point input since the centroid location of the touch points do not change. When the two pointers are touching and in view of the imaging devices 40 and 42, they are then recognized as a single touch point. When the two pointers separate during a zoom gesture, the pointers are resolved into separate touch points as identified in step 1334 and the zoom gesture is recognized in step 1346.

Figure 20:
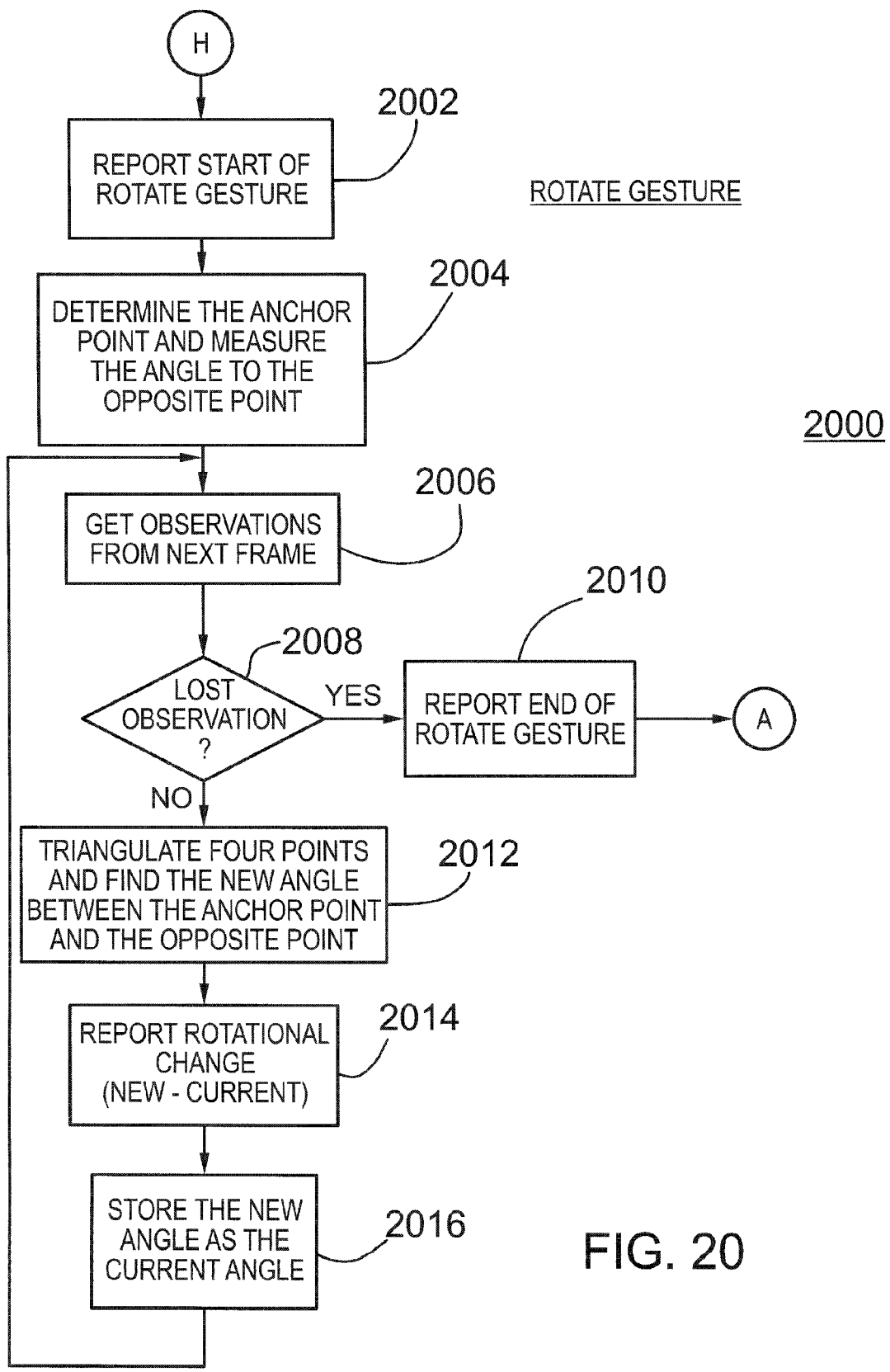
FIG. 20 is a flowchart of a rotate gesture routine executed by the master controller of FIG. 3.

FIG. 20 is a flowchart showing the rotate gesture routine 2000 (labeled H on FIG. 13). In step 2002, since a rotate gesture was detected, a start rotate gesture is reported to the general purpose computing device 32 by the master controller 30. In step 2004, the anchor point is determined and the angle is calculated between the anchor point and the touch point opposite the anchor point. The anchor point is defined as the touch point that has moved the least of all the touch points in the triangulation set. The angle is stored as the current angle. In step 2006, observations generated by the imaging devices 40 and 42 following processing of the next frame are acquired. In step 2008, it is determined whether the touch points have been lost. If the touch points have been lost, then in step 2010, the rotate gesture is ended and reported to the general purpose computer 32 by the master controller 30. The rotate gesture routine 2000 is then exited and the classification routine returns to step 1340. If the touch points have not been lost, then in step 2012, a new triangulation set is calculated and the new angle between the anchor point and the touch point opposite the anchor point is determined from the new triangulation set. In step 2014, the change in rotation from the current angle to the new angle is reported to the general purpose computing device 32 by the master controller 30. In step 2016, the current angle is then used to replace the new angle. The rotate gesture routine 2000 then returns to step 2006. The rotate gesture routine 2000 only ends when one or both imaging devices loses sight of a pointer.

Figure 21:
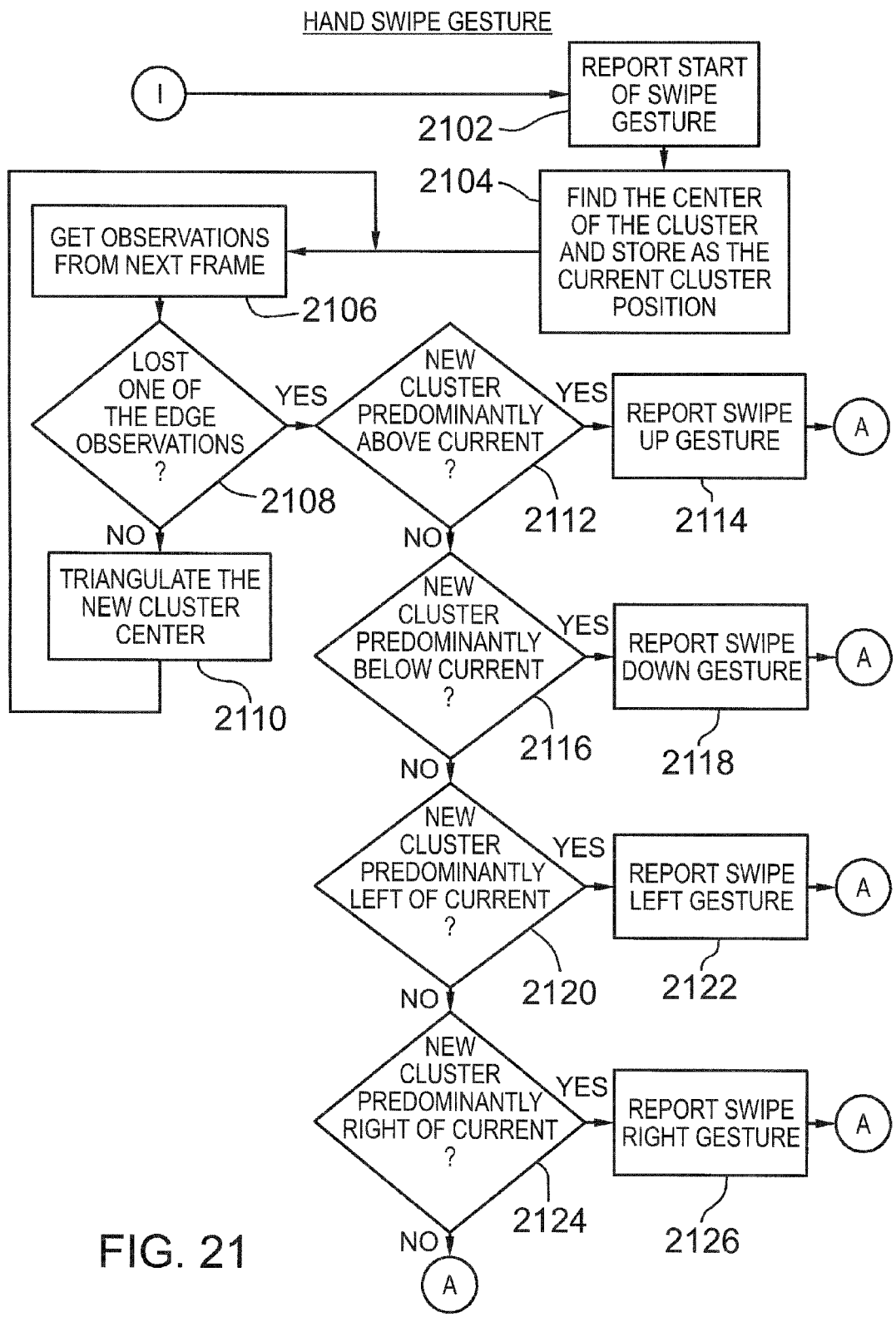
FIG. 21 is a flowchart of a hand swipe gesture routine executed by the master controller of FIG. 3.

FIG. 21 is a flowchart showing the hand swipe gesture routine 2100 (labeled I on FIG. 14). In step 2102, since a drag gesture was detected, a start swipe gesture is reported to the general purpose computing device 32 by the master controller 30. In step 2104, the center of the touch point is determined and stored as the current touch point position. The center of the touch point is calculated by adding the positions of the leftmost and rightmost edges of the observations generated by each imaging device 40 and 42 and dividing by two. The two resulting centers are triangulated as a single point on the display surface 24 to represent the center of the touch point. In step 2106, observations generated by the imaging devices 40 and 42 following processing of the next image frame are acquired. In step 2108, it is determined whether the right or left edge of the touch point has been lost. If neither edge has been lost, then in step 2110, the new cluster center is triangulated. The hand swipe gesture routine 2100 returns to step 2106. If either the right or left edge has been lost, then the hand swipe gesture routine 2100 proceeds to step 2112. A lost left or right edge is assumed to be a change that cannot be accounted for by the nature of movement of the touch points between image frames or the complete loss of sight of a pointer by one imaging device. In step 2112, it is determined if the direction of the hand swipe is above the current touch point position. The direction of the hand swipe is determined by calculating the angle between the original touch point position and the new touch point position. If the direction of the hand swipe is above the current touch point position, then in step 2114, a swipe-up event is reported to the general purpose computing device 32 by the master controller 30. The hand swipe gesture routine 2100 is then exited and the classification routine returns to step 1340.

If the direction of the hand swipe is not above the current touch point position, then in step 2116, it is determined if the direction of the hand swipe is below the current touch point position. If the direction of the hand swipe is below the current touch point position, then in step 2118, a swipe-down event is reported to the general purpose computing device 32 by the master controller 30. The hand swipe gesture routine 2100 is then exited and the classification routine returns to step 1340. If the direction of the hand swipe is not below the current touch point position, then in step 2120, it is determined if the direction of the hand swipe is predominantly to the left of the current touch point position. If the direction of the hand swipe is predominantly to the left of the current touch point position, then in step 2122, a swipe-left event is reported to the general purpose computing device 32 by the master controller 30. The hand swipe gesture routine 2100 is then exited and the classification routine returns to step 1340. If the direction of the hand swipe is not predominantly to the left of the current touch point position, then in step 2124, it is determined if the direction of the hand swipe is predominantly to the right of the current touch point position. If the direction of the hand swipe is predominantly to the right of the current touch point position, then in step 2126, a swipe-right event is reported to the general purpose computing device 32 by the master controller 30. The hand swipe gesture routine 2100 is then exited and the classification routine returns to step 1340. If the direction of the hand swipe is not predominantly to the right of the current touch point position, then the hand swipe gesture routine 2100 is exited and the classification routine returns to step 1340 of FIG. 13.

Figure 22:
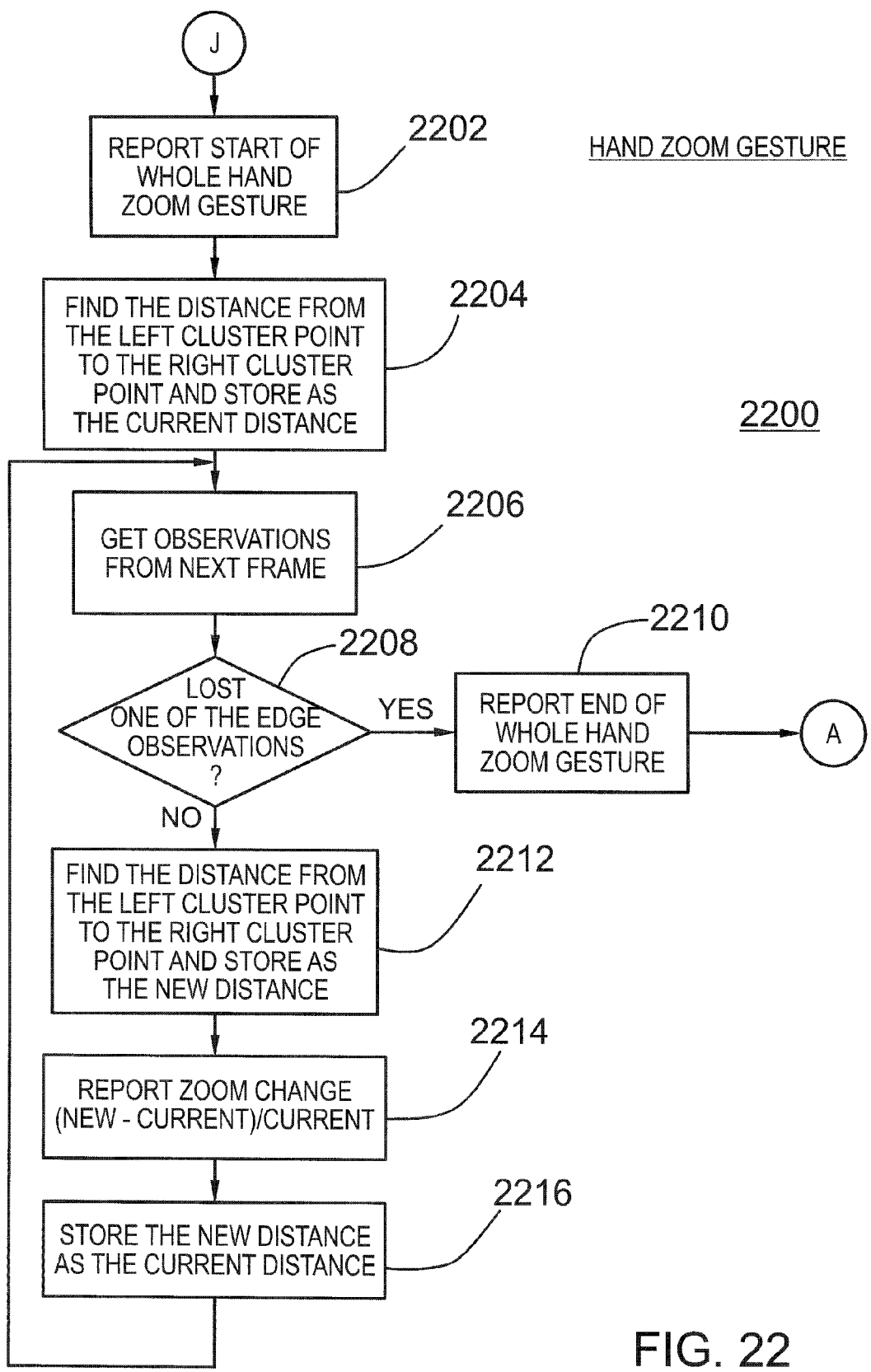
FIG. 22 is a flowchart of a hand zoom gesture routine executed by the master controller of FIG. 3.

FIG. 22 is a flowchart showing the hand zoom gesture routine 2200 (labeled J on FIG. 14). At step 2202, since a hand zoom movement was detected in step 1412 in FIG. 14, a start hand zoom gesture is reported to the general purpose computing device 32 by the master controller 30. In step 2204, the distance from the leftmost edge to the rightmost edge of the bounding box of the touch point is determined and stored as the current distance. In step 2206, observations generated by the imaging devices 40 and 42 following processing of the next frame are acquired. In step 2208, it is determined whether the left or right edge of the bounding box of the touch point has been lost. If the left or right edge of the touch point has been lost, then in step 2210, an end hand zoom gesture zoom is reported to the general purpose computing device 32 by the master controller 30. The hand zoom gesture routine 2200 is then exited and the classification routine returns to step 1340 of FIG. 13. If the left or right edge of the touch point has not been lost, then in step 2212, bounding box of the cluster is calculated for the new position of the touch point and the distance between the leftmost touch point and the rightmost touch point of new triangulation set is determined. In step 2214, the change in zoom from the current distance to the new distance is reported to the general purpose computing device 32 by the master controller 30. In step 2016, the current distance is used to replace the new distance. The hand zoom gesture routine 2200 then returns to step 2206. The hand zoom gesture routine 2200 only ends when one or both imaging devices loses sight of a pointer.

Figure 23:
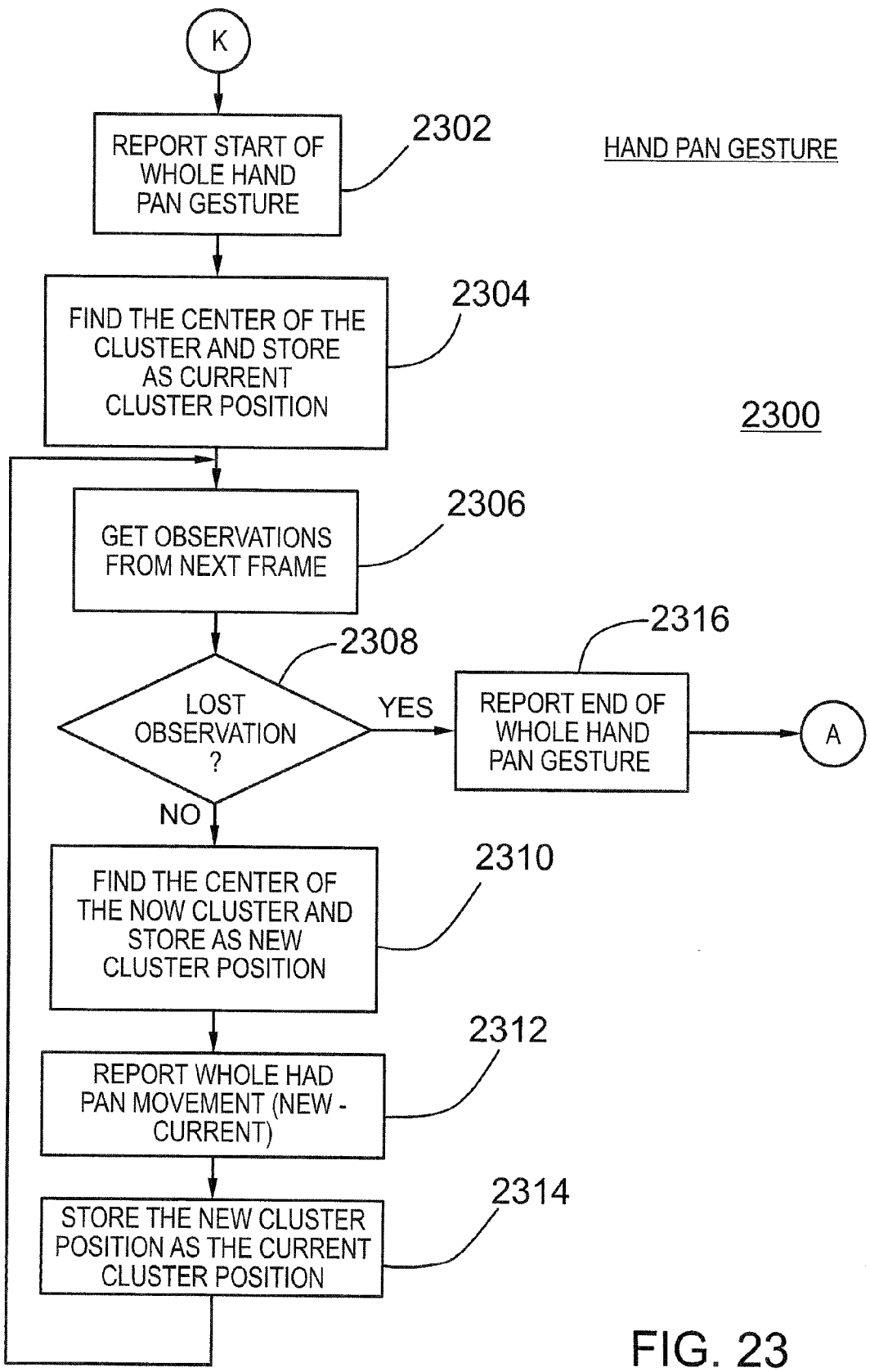
FIG. 23 is a flowchart of a hand pan gesture routine executed by the master controller of FIG. 3.

FIG. 23 is a flowchart showing the hand pan gesture routine 2300 (labeled K on FIG. 14). In step 2302, since a drag gesture was detected, a start pan gesture is reported to the general purpose computing device 32 by the master controller 30. In step 2304, the center of the touch point is determined and stored as the current touch point position. The center of the touch point is calculated by adding the positions of the leftmost and rightmost observation edges in each imaging device and dividing by two. The two resulting centers are triangulated as a single touch point on the display surface 24 to represent the center of the touch point. In step 2306, observations generated by the imaging devices 40 and 42 following processing of the next image frame are acquired. In step 2308, it is determined whether observations of the touch point have been lost. If observations of the touch point have not been lost, then in step 2310, the new touch point center is triangulated for the new position and stored as the new touch point position. A hand pan movement is then reported to the general purpose computing device 32 by the master controller 30 in step 2312 and the new touch point position stored as the current touch point position in step 2314. The gesture routine 2300 returns to step 2306. If the observations have been lost, then the hand pan gesture proceeds to step 2316 where the end of the hand pan gesture is reported to the general purpose computing device 32 by the master controller 30. The hand pan gesture routine 2300 is then exited and the classification routine returns to step 1340.

Figure 24:
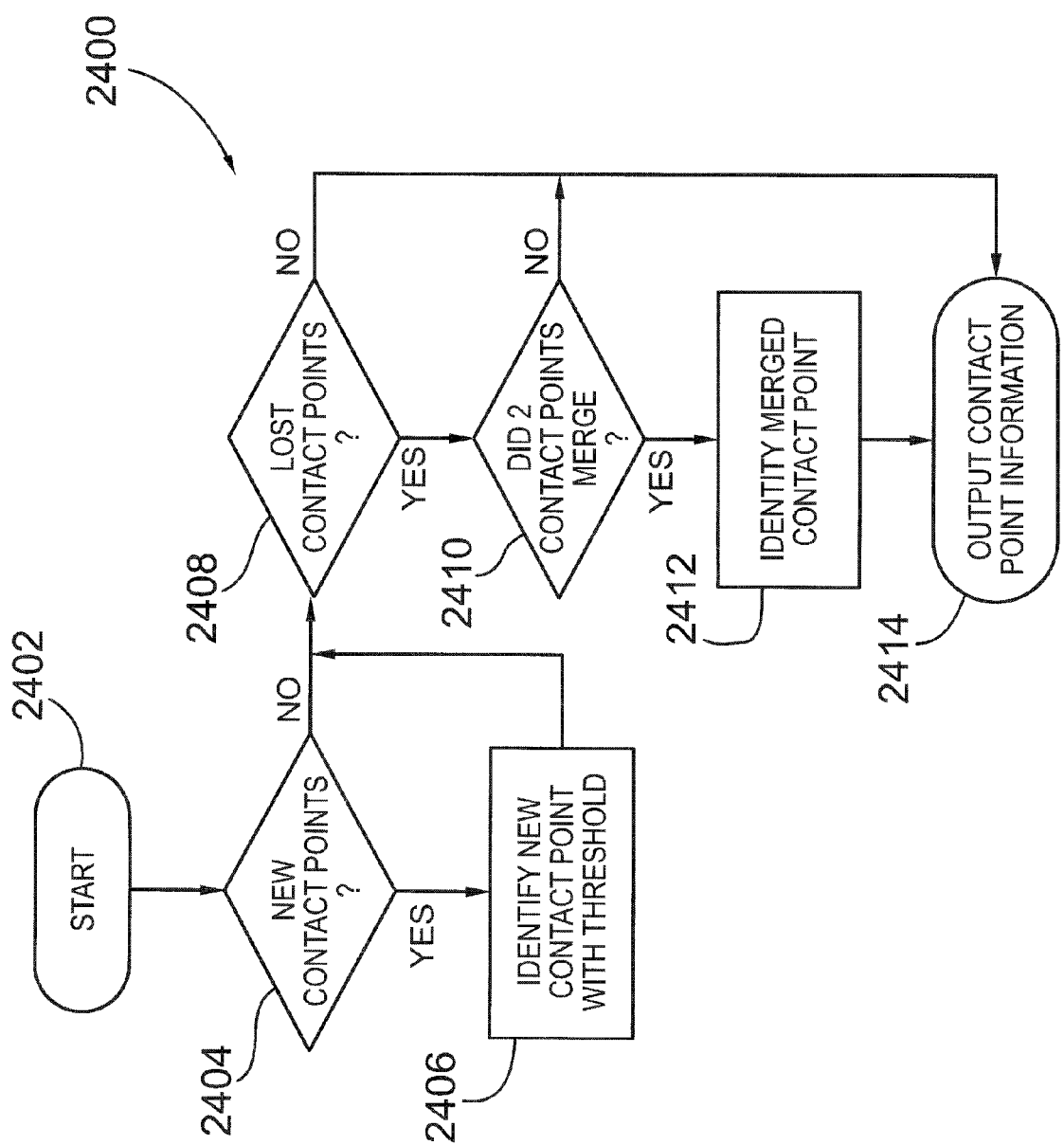
FIG. 24 is a flowchart of a pointer detection threshold process performed by the master controller of FIG. 3.

FIG. 24 is a flowchart demonstrating a pointer detection threshold process 2400 that may be performed by DSP 390 to assist in pointer disambiguation when pointers approach one another or even seem to merge. At step 2402, the image frames acquired by the imaging devices 40 and 42 are acquired and observations are determined. The image frames are then compared to previously acquired image frames and at step 2404 it is determined whether new touch points have been determined. If a new touch point is identified, at step 2406, the new touch point is assigned an identification number and a threshold value.

The threshold value assigned at step 2406 is the virtual size of the touch point. In most cases, to improve pointer tracking, the pointer threshold value will be less than the size of the actual pointer and will be located at the centroid of the touch point. Threshold guidelines can be set by the user based on pointer size or type. Pointers below a certain diameter, for example, may be identified as a stylus and given a certain threshold. Pointers above a certain size may be treated as hand gestures and assigned a threshold equal to or larger than the pointer itself to facilitate the grouping of adjacent pointers. Other sizes may be identified as fingers and given thresholds significantly smaller than the actual pointer to avoid accidental pointer merging. In the case of identifying pointers as fingers, the chosen threshold pointer size could be defined as the size of the actual pointer minus a certain multiple of the standard deviation in finger pointer sizes.

Once the threshold value has been assigned in step 2406, or if no new touch points are found at step 2404, step 2408 checks for lost touch points. If no touch points have been lost, the existing touch points, identification numbers and threshold values are retained and output at step 2414.

If a pointer contact is deemed lost at step 2408, step 2410 determines whether two or more pointers have merged. Pointer contacts are deemed to have merged if the threshold values overlap. In the case where a user's fingers touch momentarily, as in the case of a zoom in motion, the threshold pointer sizes, since they are smaller than the actual pointers, will not overlap, and the two pointers will continue to be recognized. In some cases, depending on the threshold values assigned to certain pointer size and types, two or more pointers will be merged into a single, larger pointer. The merged touch point may be identified at step 2412 as a new pointer or it may retain the identity of the largest, oldest, or otherwise most dominant pointer. The unchanged pointer contacts, and the pointers identified at step 2412 are output at 2414.

One of skill in the art will appreciate that interactive input system 20 operates with both passive pointers and active pointers. As mentioned above, a passive pointer is typically one that does not emit any signal when used in conjunction with the interactive input system. Passive pointers may include, for example, fingers, cylinders of material or other objects brought into contact with the display surface 24.

One of skill in the art will also appreciate that while the above gesture detection methods are described with reference to an interactive input system employing two imaging devices that look generally across the display surface 24, the gesture recognition methods may also be applied in an interactive input system using frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In a multi-touch interactive input system, the machine vision system captures images including the point(s) of escaped light, and processes the images to identify the position of the pointers on the waveguide surface based on the point(s) of escaped light for use as input to application programs.

Figure 25:
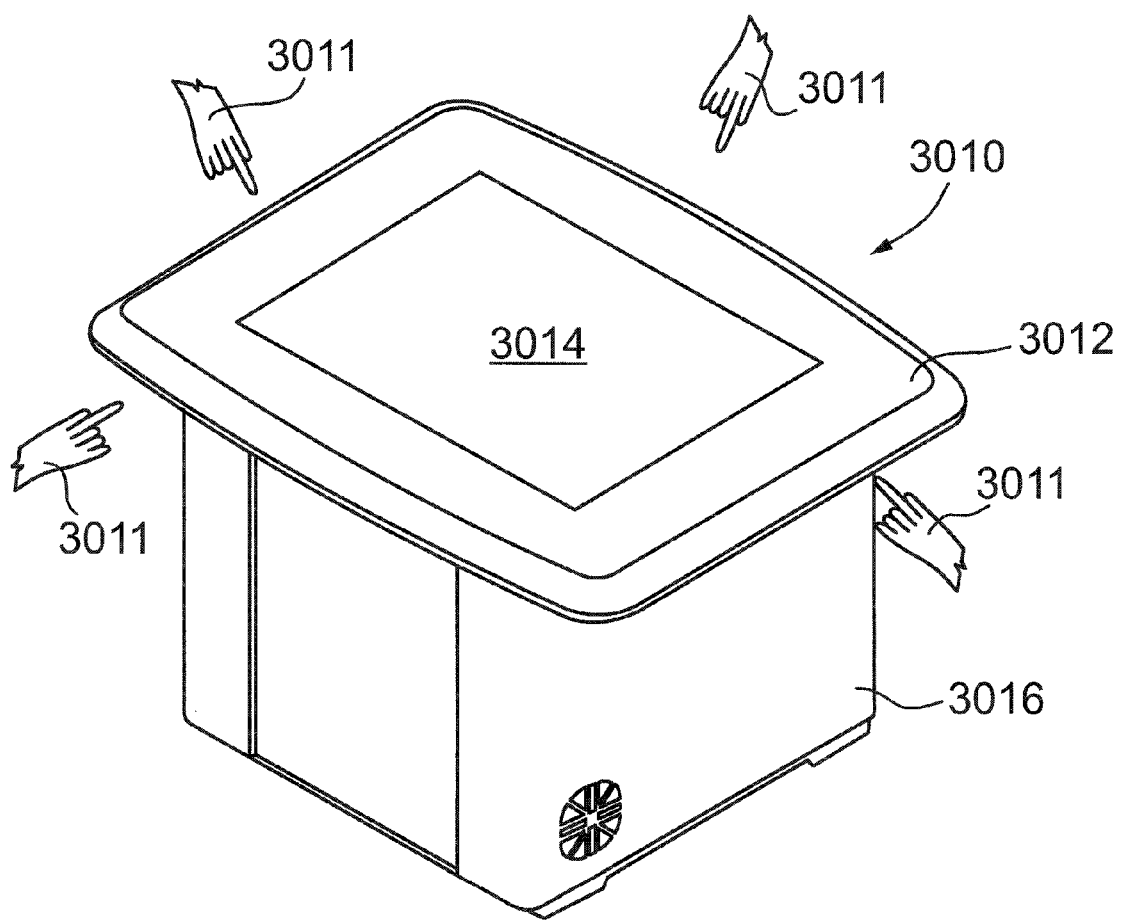
FIG. 25 is a perspective view of an interactive input system employing frustrated total internal reflection.
Figure 26:
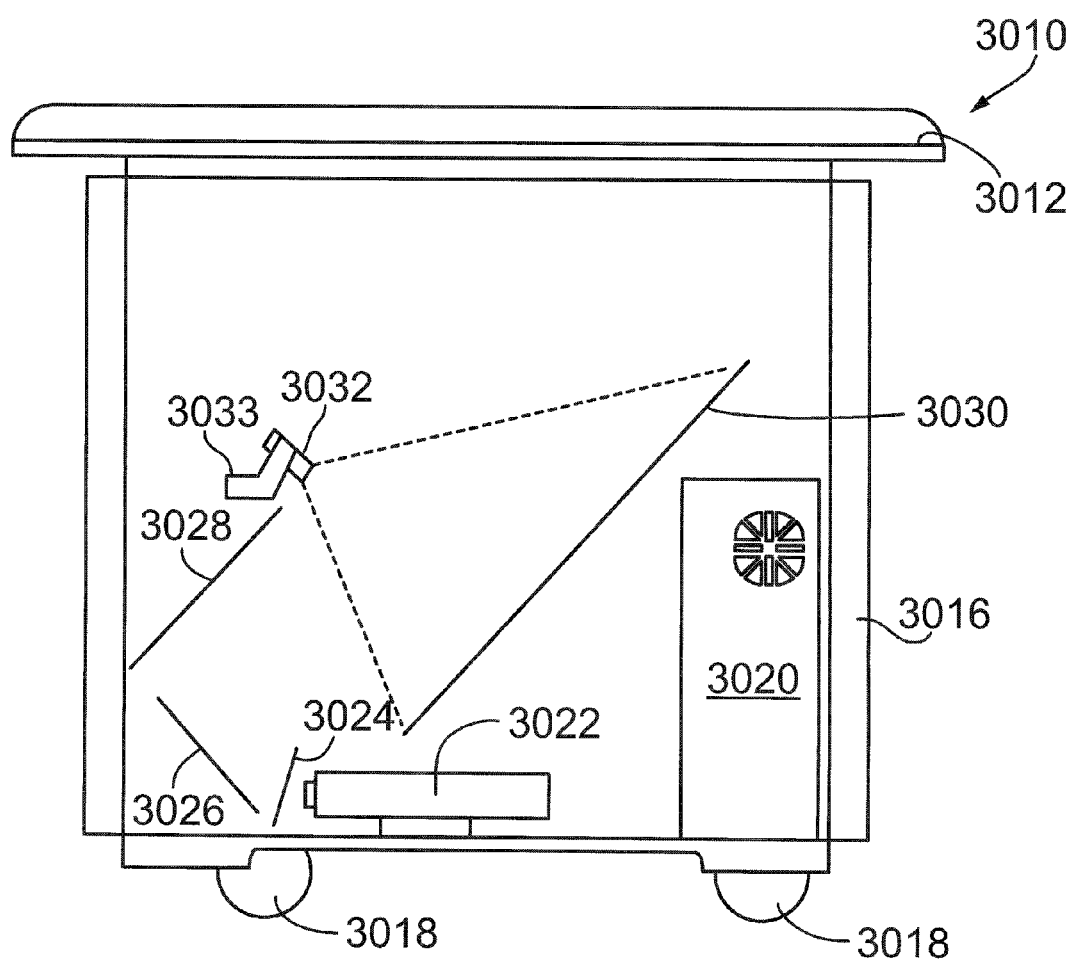
FIG. 26 is a side sectional view of the interactive input system of FIG. 25.

For example, turning now to FIGS. 25 and 26, a perspective diagram of an FTIR interactive input system in the form of a touch table is shown and is generally identified by reference numeral 3010. Touch table 3010 comprises a table top 3012 mounted atop a cabinet 3016. In this embodiment, cabinet 3016 sits atop wheels, castors or the like 3018 that enable the touch table 3010 to be easily moved from place to place as requested. Integrated into table top 3012 is a coordinate input device in the form of a frustrated total internal refraction (FTIR) based touch panel 3014 that enables detection and tracking of one or more pointers 3011, such as fingers, pens, hands, cylinders, or other objects, applied thereto.

Cabinet 3016 supports the table top 3012 and touch panel 3014, and houses a processing structure 3020 (see FIG. 26) executing a host application and one or more application programs. Image data generated by the processing structure 30201 is displayed on the touch panel 3014 allowing a user to interact with the displayed image via pointer contacts on the display surface 3015 of the touch panel 3014. The processing structure 3020 interprets pointer contacts as input to the running application program and updates the image data accordingly so that the image displayed on the display surface 3015 reflects the pointer activity. In this manner, the touch panel 3014 and processing structure 3020 allow pointer interactions with the touch panel 3014 to be recorded as handwriting or drawing or used to control execution of application programs.

Processing structure 3020 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure 3020, a graphical user interface comprising a background, upon which graphic widgets are displayed, is presented on the display surface of the touch panel 3014. In this embodiment, the background is a three-dimensional environment, and the graphical user interface is presented on the touch panel 3014, such that three-dimensional graphic widgets in the three-dimensional environment can be manipulated via pointer interaction with the display surface 3015 of the touch panel 3014.

The cabinet 3016 also houses a horizontally-oriented projector 3022, an infrared (IR) filter 3024, and mirrors 3026, 3028 and 3030. An imaging device 3032 in the form of an infrared-detecting camera is mounted on a bracket 3033 adjacent mirror 3028. The system of mirrors 3026, 3028 and 3030 functions to "fold" the images projected by projector 3022 within cabinet 3016 along the light path without unduly sacrificing image size. The overall touch table 3010 dimensions can thereby be made compact.

The imaging device 3032 is aimed at mirror 3030 and thus sees a reflection of the display surface 3015 in order to mitigate the appearance of hotspot noise in captured images that typically must be dealt with in systems having imaging devices that are aimed directly at the display surface 3015. Imaging device 3032 is positioned within the cabinet 3016 by the bracket 3033 so that it does not interfere with the light path of the projected image.

During operation of the touch table 3010, processing structure 3020 outputs video data to projector 3022 which, in turn, projects images through the IR filter 3024 onto the first mirror 3026. The projected images, now with IR light having been substantially filtered out, are reflected by the first mirror 3026 onto the second mirror 3028. Second mirror 3028 in turn reflects the images to the third mirror 3030. The third mirror 3030 reflects the projected video images onto the display (bottom) surface of the touch panel 3014. The video images projected on the bottom surface of the touch panel 3014 are viewable through the touch panel 3014 from above. The system of three mirrors 3026, 3028, 3030 configured as shown provides a compact path along which the projected image can be channeled to the display surface. Projector 3022 is oriented horizontally in order to preserve projector bulb life, as commonly-available projectors are typically designed for horizontal placement.

The projector 3022, and IR-detecting camera 3032 are each connected to and managed by the processing structure 3020. A power supply (not shown) supplies electrical power to the electrical components of the touch table 3010. The power supply may be an external unit or, for example, a universal power supply within the cabinet 3016 for improving portability of the touch table 3010. The cabinet 3016 fully encloses its contents in order to restrict the levels of ambient visible and infrared light entering the cabinet 3016 thereby to facilitate satisfactory signal to noise performance. Doing this can compete with various techniques for managing heat within the cabinet 3016. The touch panel 3014, the projector 3022, and the processing structure are all sources of heat, and such heat if contained within the cabinet 3016 for extended periods of time can create heat waves that can distort the optical components of the touch table 3010. As such, the cabinet 3016 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich et al., filed on Sep. 29, 2008, entitled "TOUCH PANEL FOR AN INTERACTIVE INPUT SYSTEM AND INTERACTIVE INPUT SYSTEM INCORPORATING THE TOUCH PANEL" and assigned to SMART Technologies ULC of Calgary, Alberta, the assignee of the subject application, the content of which is incorporated herein by reference.

Figure 27:
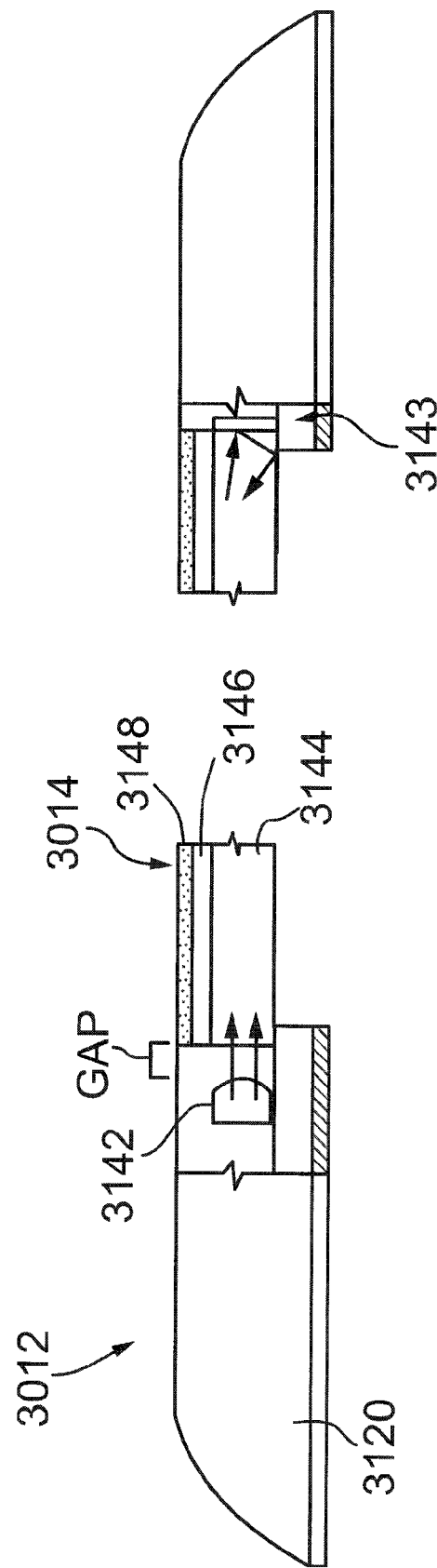
FIG. 27 a sectional view of a table top and touch panel forming part of the interactive input system of FIG. 25.

As set out above, the touch panel 3014 of touch table 3010 operates based on the principles of frustrated total internal reflection (FTIR), as described further in U.S. patent application Ser. No. 12/240,953 to Sirotich et al., referred to above. FIG. 27 is a sectional view of the table top 3012 and touch panel 3014. Table top 3012 comprises a frame 3120 formed of plastic supporting the touch panel 3014.

Touch panel 3014 comprises an optical waveguide 3144 that, according to this embodiment, is a sheet of acrylic. A resilient diffusion layer 3146, in this embodiment a layer of V-CARE® V-LITE® barrier fabric manufactured by Vintex Inc. of Mount Forest, Ontario, Canada, or other suitable material lies against the optical waveguide 3144.

The diffusion layer 3146, when pressed into contact with the optical waveguide 3144, substantially reflects the IR light escaping the optical waveguide 3144 so that escaping IR light travels down into the cabinet 3016. The diffusion layer 3146 also diffuses visible light being projected onto it in order to display the projected image.

Overlying the resilient diffusion layer 3146 on the opposite side of the optical waveguide 3144 is a clear, protective layer 3148 having a smooth touch surface. In this embodiment, the protective layer 3148 is a thin sheet of polycarbonate material over which is applied a hardcoat of Marnot® material, manufactured by Tekra Corporation of New Berlin, Wis., U.S.A. While the touch panel 3014 may function without the protective layer 3148, the protective layer 3148 permits use of the touch panel 14 without undue discoloration, snagging or creasing of the underlying diffusion layer 3146, and without undue wear on users' fingers. Furthermore, the protective layer 3148 provides abrasion, scratch and chemical resistance to the overall touch panel 3014, as is useful for panel longevity.

The protective layer 3148, diffusion layer 3146, and optical waveguide 3144 are clamped together at their edges as a unit and mounted within the table top 3012. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods.

An IR light source comprising a bank of infrared light emitting diodes (LEDs) 3142 is positioned along at least one side surface of the optical waveguide layer 3144 (into the page in FIG. 27). Each LED 3142 emits infrared light into the optical waveguide 3144. In this embodiment, the side surface along which the IR LEDs 3142 are positioned is flame-polished to facilitate reception of light from the IR LEDs 3142. An air gap of 1-2 millimeters (mm) is maintained between the IR LEDs 3142 and the side surface of the optical waveguide 3144 in order to reduce heat transmittance from the IR LEDs 3142 to the optical waveguide 3144, and thereby mitigate heat distortions in the acrylic optical waveguide 3144. Bonded to the other side surfaces of the optical waveguide 3144 is reflective tape 3143 to reflect light back into the optical waveguide layer 3144 thereby saturating the optical waveguide layer 3144 with infrared illumination.

In operation, IR light is introduced via the flame-polished side surface of the optical waveguide 3144 in a direction generally parallel to its large upper and lower surfaces. The IR light does not escape through the upper or lower surfaces of the optical waveguide due to total internal reflection (TIR) because its angle of incidence at the upper and lower surfaces is not sufficient to allow for its escape. The IR light reaching other side surfaces is generally reflected entirely back into the optical waveguide 3144 by the reflective tape 3143 at the other side surfaces.

Figure 28:
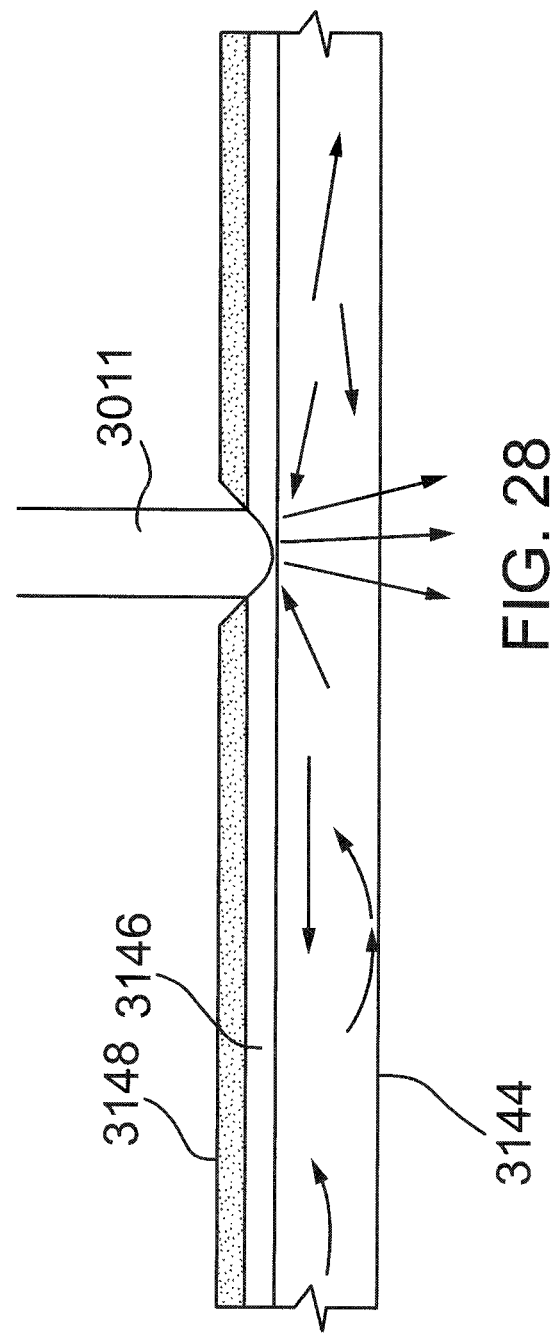
FIG. 28 is a side sectional view of the touch panel of FIG. 27, having been contacted by a pointer.

As shown in FIG. 28, when a user contacts the display surface of the touch panel 3014 with a pointer 3011, the touching of the pointer 3011 against the protective layer 3148 compresses the resilient diffusion layer 3146 against the optical waveguide 3144, causing the index of refraction on the optical waveguide 3144 at the contact point of the pointer 3011, or "touch point" to change. This change "frustrates" the TIR at the touch point causing IR light to reflect at an angle that allows it to escape from the optical waveguide 3144 in a direction generally perpendicular to the plane of the optical waveguide 3144 at the touch point. The escaping IR light reflects off of the pointer 3011 and scatters locally downward through the optical waveguide 3144 and exist the optical waveguide 3144 through its bottom surface. This occurs for each pointer 3011 as it contacts the touch surface at a respective touch point.

As each touch point is moved along the display surface 3015 of the touch panel 3014, the compression of the resilient diffusion layer 3146 against the optical waveguide 3144 occurs and thus escaping of IR light tracks the touch point movement. During touch point movement or upon removal of the touch point, decompression of the diffusion layer 3146 where the touch point had previously been due to the resilience of the diffusion layer 3146, causes escape of IR light from optical waveguide 3144 to once again cease. As such, IR light escapes from the optical waveguide 3144 only at touch point location(s) allowing the IR light to be captured in image frames acquired by the imaging device.

The imaging device 3032 captures two-dimensional, IR video images of the third mirror 3030. IR light having been filtered from the images projected by projector 3022, in combination with the cabinet 3016 substantially keeping out ambient light, ensures that the background of the images captured by imaging device 3032 is substantially black. When the display surface 3015 of the touch panel 3014 is contacted by one or more pointers as described above, the images captured by IR camera 3032 comprise one or more bright points corresponding to respective touch points. The processing structure 3020 receives the captured images and performs image processing to detect the coordinates and characteristics of the one or more touch points based on the one or more bright points in the captured images. The detected coordinates are then mapped to display coordinates and interpreted as ink or mouse events by the processing structure 3020 for manipulating the displayed image.

The host application tracks each touch point based on the received touch point data, and handles continuity processing between image frames. More particularly, the host application receives touch point data from frames and based on the touch point data determines whether to register a new touch point, modify an existing touch point, or cancel/delete an existing touch point. Thus, the host application registers a Contact Down event representing a new touch point when it receives touch point data that is not related to an existing touch point, and accords the new touch point a unique identifier. Touch point data may be considered unrelated to an existing touch point if it characterizes a touch point that is a threshold distance away from an existing touch point, for example. The host application registers a Contact Move event representing movement of the touch point when it receives touch point data that is related to an existing pointer, for example by being within a threshold distance of, or overlapping an existing touch point, but having a different focal point. The host application registers a Contact Up event representing removal of the touch point from the display surface 3015 of the touch panel 3014 when touch point data that can be associated with an existing touch point ceases to be received from subsequent images. The Contact Down. Contact Move and Contact Up events are passed to respective elements of the user interface such as the graphic widgets, or the background, based on the element with which the touch point is currently associated, and/or the touch points current position. Routines similar to those previously described can be run by the host application allowing the host application to detect multi-pointer gestures.

Figure 29:
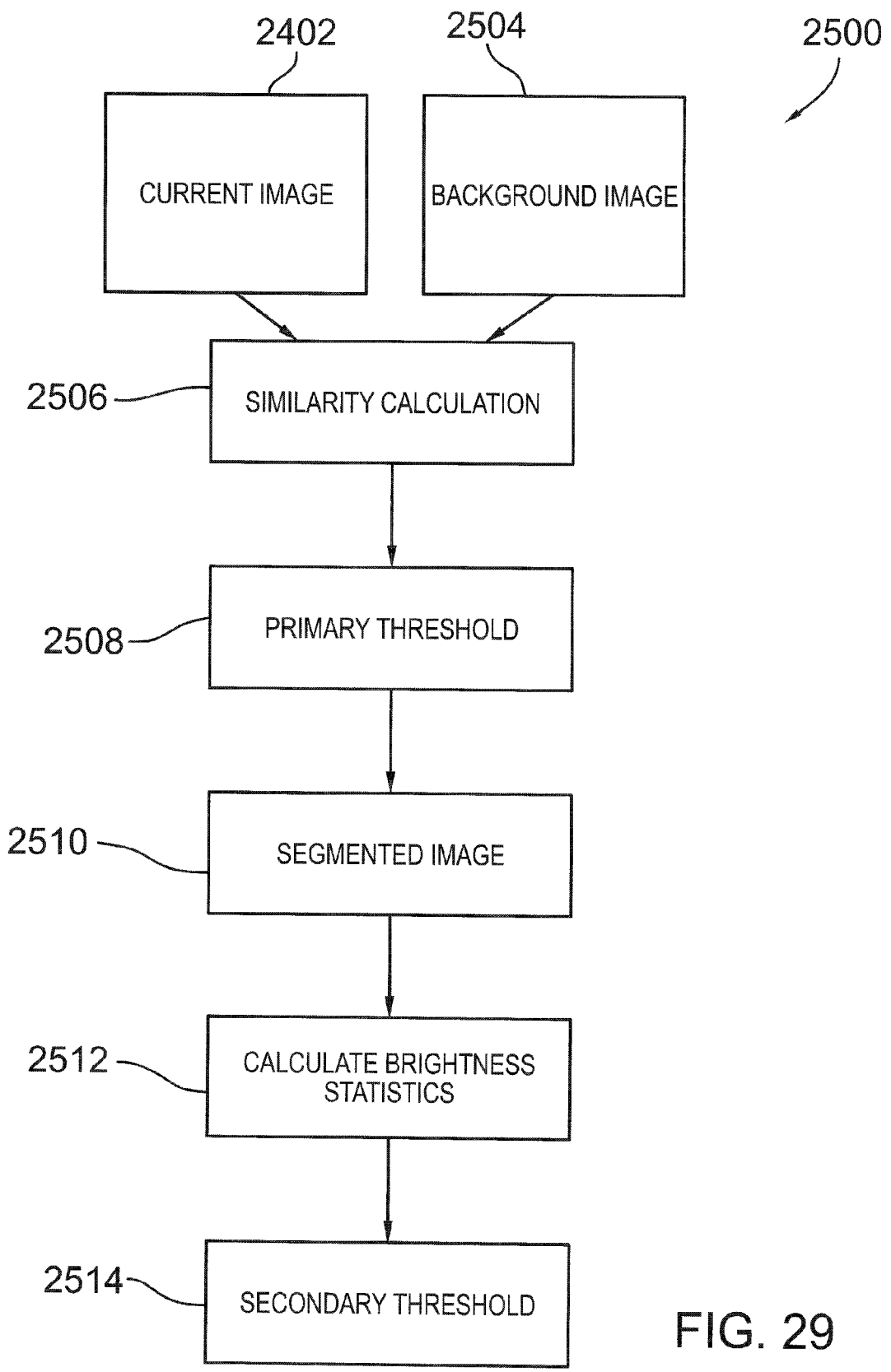
FIG. 29 is a block diagram depicting an alternative pointer detection threshold process performed by the interactive input system of FIG. 25.
Figure 30:
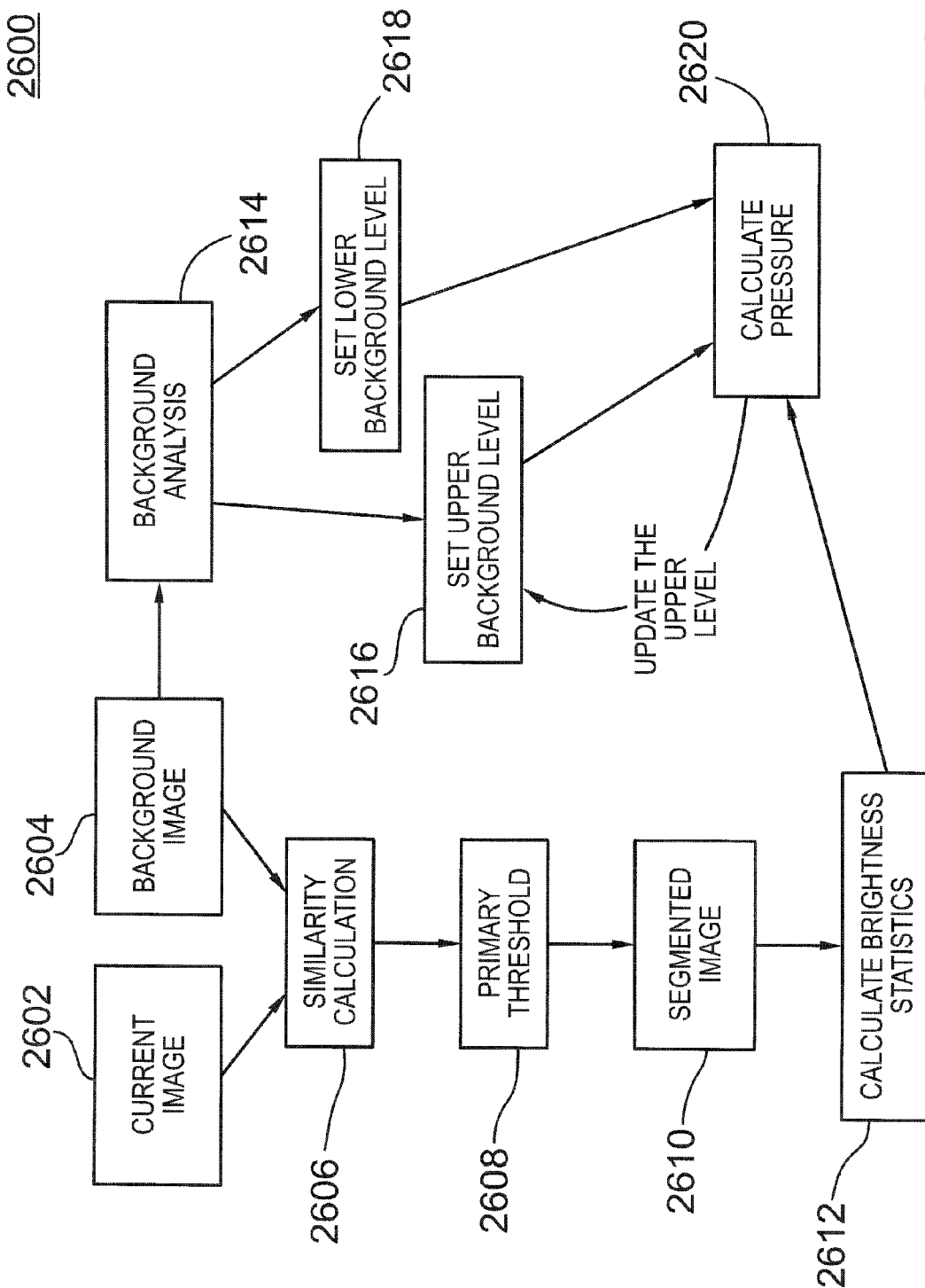
FIG. 30 is a block diagram depicting the pointer contact pressure estimation system.

Another embodiment of the thresholding process 2400 suitable for use in the FTIR interactive input system described above is shown in FIG. 29. In the FTIR thresholding process 2500, the current image 2502 and the background image 2504 are compared in a similarity calculation 2506 to identify pointer contacts. At step 2508 a primary threshold is applied to the touch points. This threshold can be user adjustable as described in thresholding process 2400 to assign certain threshold properties to certain sizes of pointers.

At step 2510, the image is segmented so that only those regions where pointer contacts appear are processed by the system to reduce the processing load. In step 2512, the average brightness and standard deviation of pixels inside each segmented region are calculated, and in step 2514, the threshold of each pointer is set to the average brightness value plus a multiple of the standard deviation in brightness. This threshold is typically set at about 1 standard deviation from the mean. The pointer contact is now represented by a virtual pointer having the threshold size.

In the FTIR system described above, it is possible to estimate the contact pressure applied by a user when touching the touch area by measuring the changing pointer size or brightness. Process 2600 in FIG. 26 outlines the pointer contact pressure estimation system. As with process 2500, the current image 2602 and the background image 2604 are compared in the similarity calculation 2606 to identify pointer contacts. At step 2608 a primary threshold is applied to the touch points. This threshold can be user adjustable as described in thresholding process 2400 to assign certain threshold properties to certain sizes of pointers.

At step 2610, the image is segmented so that only those regions where pointer contacts appear are processed by the system to reduce the processing load. In step 2512, the average brightness and standard deviation of pixels inside each segmented region are calculated. At step 2620, the pressure is estimated using the using the pointer contact brightness calculated in step 2612 and normalized using the upper and lower background levels. The upper background level 2616 is then updated with feedback from the calculated pressure.

At step 2614, a background analysis is performed by averaging the brightness and standard deviation of the background image 2604. At step 2618, the lower background level is set to the average background brightness level minus one standard deviation. At step 2616, the upper background level is set to an arbitrary reasonable default value.

The background image 2504 is continuously updated by blending some areas of the current image devoid of pointers on a frame by frame basis. When pointers dwell beyond a certain threshold time, they are ignored by the pointer recognition software as inactive pointers, such as a hand, mouse, cup, etc. resting on the input surface. When the latent pointer is removed, the background image is updated immediately to allow contact detect in that region.

As mentioned above, the gestures described herein are merely examples of gestures that may be used with the interactive input system. As one of skill in the art will appreciate, other whole hand or multiple touch point gestures that may be used in application associated with such interactive input system can employ similar routines as outlined above.

Rather than employing an illuminated bezel, the assembly may comprise a reflective or retroreflective bezel that reflects radiation emitted by radiation sources associated with the imaging devices so that the imaging devices see white bands in the absence of pointers.

Although, the assembly 22 is described as employing machine vision, the assembly may alternatively employ electromagnetic, capacitive, acoustic or other technologies to register pointer interaction with the display surface 24.

Those of skill in the art will also appreciate that other variations and modifications from those described may be made without departing from the scope and spirit of the invention, as defined by the appended claims.

What is claimed is:

1. A gesture recognition method comprising:
capturing images using imaging sensors having fields of view aimed generally across or at an input surface from different vantages;
processing the captured images to detect a pair of hands brought into contact with said input surface and for each detected hand calculating a bounding box, the calculated bounding box surrounding either a cluster of proximate touch points resulting from multiple fingers of the hand being in contact with said input surface or a single large touch region exceeding a threshold size resulting from a palm region of the hand being in contact with said input surface;
creating an observation for each bounding box in each captured image, each observation in each captured image defined by the area formed between two straight lines, one line of which extends from the focal point of the imaging sensor that captured the image and crosses the right edge of the bounding box and the other line of which extends from the focal point of the imaging sensor that captured the image and crosses the left edge of the bounding box;
in response to relative movement of the hands over the input surface, recognizing a gesture based on corresponding relative movement of the created observations;
executing a command associated with the recognized gesture; and
updating an image displayed on said input surface in accordance with the executed command.

2. An interactive input system comprising:
an input surface;
at least two imaging sensors having fields of view aimed generally across or at said input surface from different vantages; and
processing structure communicating with said at least one imaging sensor, said processing structure being configured to:
analyze images captured by said at least one imaging sensor to detect multiple hands brought into contact with said input surface,
for each detected hand, calculate a bounding box, the bounding box surrounding either a cluster of proximate touch points resulting from multiple fingers of the hand being in contact with said input surface or a single large touch region exceeding a threshold size resulting from a palm region of the hand being in contact with said input surface,
create an observation for each bounding box in each captured image, wherein each observation in each captured image defined by the area formed between two straight lines, one line of which extends from the focal point of the imaging sensor that captured the image and crosses the right edge of the bounding box and the other line of which extends from the focal point of the imaging sensor that captured the image and crosses the left edge of the bounding box;

in response to relative movement of the hands over the input surface, recognize a gesture based on corresponding relative movement of the created bounding boxes, execute a command associated with said recognized gesture, and update an image displayed on said input surface in accordance with the executed command.

3. The method of claim 1, wherein said gesture is one of a zoom gesture and a pan gesture.

4. The method of claim 3, wherein said zoom gesture is recognized by detecting an increase or a decrease in the distance between extreme edges of the created observations.

5. The method of claim 4, wherein said command is an enlarge command if the distance increases and a shrink command if the distance decreases.

6. The method of claim 3, wherein said pan gesture is recognized by detecting movement of said created observations in the same direction with the spacing between said created observations being maintained.

7. A non-transitory computer readable medium having computer program code stored thereon, the computer program code, when executed by a processor, causing an apparatus at least to perform the method of claim 1.

8. The interactive input system of claim 2, wherein said processing structure is configured to recognize one of a zoom gesture and a pan gesture.

9. The interactive input system of claim 8, wherein said processing structure is configured to recognize said zoom gesture by detecting an increase or a decrease in the distance between extreme edges of the created observations.

10. The interactive input system of claim 9, wherein said command is an enlarge command if the distance increases and a shrink command if the distance decreases.

11. The interactive input system of claim 8, wherein said processing structure is configured to recognize said pan gesture by detecting movement of said created observations in the same direction with the spacing between said created observations being maintained.

12. The interactive input system of claim 2, wherein said input surface is a display surface of a display unit.

13. The interactive input system of claim 2, wherein said input surface is a generally horizontal table surface.

14. The interactive input system of claim 13 further comprising a projector for projecting said image on said input surface.

* * * * *